(12) United States Patent
Yumiki et al.

(10) Patent No.: US 7,559,656 B2
(45) Date of Patent: Jul. 14, 2009

(54) PROJECTOR SYSTEM

(75) Inventors: Naoto Yumiki, Osaka (JP); Yoshimasa Fushimi, Osaka (JP); Syunsuke Kimura, Hyogo (JP); Takayuki Hayashi, Kyoto (JP); Seiichi Suzuki, Osaka (JP); Tomoya Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 599 days.

(21) Appl. No.: 10/547,716

(22) PCT Filed: Mar. 2, 2004

(86) PCT No.: PCT/JP2004/002544

§ 371 (c)(1),
(2), (4) Date: Aug. 31, 2005

(87) PCT Pub. No.: WO2004/079558

PCT Pub. Date: Sep. 16, 2004

(65) Prior Publication Data

US 2006/0170874 A1    Aug. 3, 2006

(30) Foreign Application Priority Data

Mar. 3, 2003 (JP) .............................. 2003-056205
Apr. 3, 2003 (JP) .............................. 2003-100733
Apr. 3, 2003 (JP) .............................. 2003-100734

(51) Int. Cl.
*G03B 21/14* (2006.01)
*G06F 13/18* (2006.01)

(52) U.S. Cl. .......................... 353/42; 715/740; 715/741

(58) Field of Classification Search .................. 353/42, 353/69, 70, 101; 715/741, 743, 740; 345/182, 345/157; 348/14.08
See application file for complete search history.

(56) References Cited

U.S. PATENT DOCUMENTS

| 5,181,015 | A | 1/1993 | Marshall et al. |
| 5,654,741 | A | 8/1997 | Sampsell et al. |
| 6,346,933 | B1 * | 2/2002 | Lin ............................. 345/157 |
| 6,512,507 | B1 | 1/2003 | Furihata et al. |
| 7,193,608 | B2 * | 3/2007 | Stuerzlinger ................. 345/156 |

(Continued)

FOREIGN PATENT DOCUMENTS

JP             64-41021           2/1989

(Continued)

OTHER PUBLICATIONS

International Search Report for application No. PCT/JP2004/002544 dated May 18, 2004.

*Primary Examiner*—William C Dowling
(74) *Attorney, Agent, or Firm*—RatnerPrestia

(57) ABSTRACT

A projector system includes a first projection section projecting inputted image information onto a projection target, a laser pointer pointing a predetermined part of an image projected onto a screen 1, an image pick-up section picking up the image in a state pointed by the laser pointer, and a pointed position detecting section detecting the position of the part pointed by the laser pointer on the basis of the image information picked up by the image pick-up section. And a projection lens projects an image on the basis of the position of the part pointed by the laser pointer and detected by the pointed position detecting section and/or in correspondence to the image of the pointed part.

6 Claims, 31 Drawing Sheets

U.S. PATENT DOCUMENTS

| | | |
|---|---|---|
| 2002/0036652 A1 | 3/2002 | Masumoto et al. |
| 2005/0184958 A1* | 8/2005 | Gnanamgari et al. ........ 345/157 |
| 2007/0045420 A1* | 3/2007 | Seko et al. ................. 235/454 |
| 2009/0040178 A1* | 2/2009 | Machida et al. ............. 345/158 |

FOREIGN PATENT DOCUMENTS

| | | |
|---|---|---|
| JP | 03-167621 | 7/1991 |
| JP | 05-165102 | 6/1993 |
| JP | 06-035607 A | 2/1994 |
| JP | 8-161114 | 6/1996 |
| JP | 08-331667 | 12/1996 |
| JP | 11-509660 | 8/1999 |
| JP | 11-345085 A | 12/1999 |
| JP | 2000-56925 A | 2/2000 |
| JP | 2000-089359 A | 3/2000 |
| JP | 2002-108561 A | 4/2002 |
| JP | 2002-196740 A | 7/2002 |
| JP | 2002-229735 A | 8/2002 |
| WO | WO 97/41502 | 11/1997 |

* cited by examiner

PROJECTOR SYSTEM

This application is a U.S. national phase application of PCT international application PCT/JP2004/002544.

TECHNICAL FIELD

The present invention relates to a projector system, a projector unit, an image projection method, an apparatus control system, an information terminal, an apparatus control method, a pointing section, programs for the same, and a recording medium.

BACKGROUND ART

A schematic configuration of a prior art projector system (see, for example, JP-A No. 2002-196740) is shown in FIG. 31.

In the projector system shown in FIG. 31, a projector unit 104 is provided with a projection lens 102. A screen 101 is arranged opposite to the projection lens 102. A laser pointer 103 is arranged such as to project light toward the screen when switched ON.

When using such a projector system, a presenter operates the projector unit 104 and thereby displays a desired image onto the screen 101 through the projection lens 102. Then, switching ON the laser pointer 103 directed toward a desired part on the screen 101, the presenter gives a presentation by pointing with the laser light to the part where the presenter desires to specify. Further, after the presentation has been given thoroughly by the presenter, or alternatively during the presentation, when a question is addressed from the audience, the presenter operates the projector unit 104 and thereby displays an image relevant to the contents of the question onto the screen 101.

Then, when a question is addressed from the audience concerning a specific part of the displayed image, the presenter moves the laser pointer 103 and thereby points the part where the questioner specifies on the screen 101.

When a plurality of persons address a question, each of a plurality of the questioners and the presenter possess a laser pointer 103 and thereby point the image on the screen 101 in some cases.

However, according to such a projector system, the presenter moves the laser pointer 103 with receiving an instruction from the questioner. Thus, it could take a long time before the optical image of the laser pointer 103 reaches the part where the questioner intends. As such, this system has been user-unfriendly. Further, in a possible situation that the image need be changed in response to an instruction of the questioner, the presenter need change the image into a desired one on the basis of oral explanation of the questioner. This approach has a poor operability, and takes a long time before a desired image is displayed.

Furthermore, when a part of the image projected on the screen 101 has been expanded, the presenter specifies a part to be expanded, on the basis of oral explanation of the questioner. Then, the presenter operates the projector unit 104 and thereby expands on the screen 101 the part of the image where the questioner intends. Such a process is unavoidable and hence causes much time and effort.

Further, it has sometimes occurred that when the presenter and a plurality of questioners point the image on the screen 101 simultaneously with the laser pointers 103, the pointing operations with the laser pointers 103 are mixed up and hence cause confusion in the display on the screen 101.

SUMMARY OF THE INVENTION

With considering the above-mentioned problems, an object of the present invention is to provide a projector system which allows not solely a presenter but also an audience person to operate image display, a program and a recording medium for the same, and an image projection method.

With considering the above-mentioned problems, another object of the present invention is to provide an apparatus control system in which even when operation is performed from a plurality of information terminals, information seldom suffers from confusion, a program and a recording medium for the same, an apparatus control method, and an information terminal.

A 1st aspect of the present invention is a projector system comprising:

a first projection section of projecting inputted image information onto a projection target;

a pointing device of at least pointing to a predetermined part of an image projected onto said projection target;

a recognition section of recognizing said image pointed to by said pointing device;

a pointed position detecting section of detecting a position of the part pointed to by said pointing device, on the basis of image information recognized by said recognition section; and an image correction section of correcting said image information at least on the basis of the position of the part pointed to by said pointing device, wherein said first projection section projects a corrected image at least on the basis of the position of the part pointed by said pointing device and detected by said pointed position detecting section.

A 2nd aspect of the present invention is a projector system according to the 1st aspect of the present invention, wherein said recognition section is an image pick-up section of picking up said image in a state pointed to by said pointing device.

A 3rd aspect of the present invention is a projector system according to the 1st aspect of the present invention, wherein said pointing device specifies an image to be corrected.

A 4th aspect of the present invention is a projector system according to the 1st aspect of the present invention, wherein said image correction section specifies an image to be corrected, on the basis of the position detected by said pointed position detecting section.

A 5th aspect of the present invention is a projector system according to the 1st aspect of the present invention, wherein said pointing device has a laser irradiation section, and wherein said pointed position detecting section detects a position of a part irradiated by said laser irradiation section within said image, on the basis of a luminance of said image.

A 6th aspect of the present invention is a projector system according to the 1st aspect of the present invention, wherein said first projection section has a first storage section of recording image information to be projected, wherein said image pick-up section has a second storage section of storing said picked-up image, so that said image pick-up section picks up a second image which is an image projected onto said projection target in a predetermined timing, and then stores the image into said second storage section, and wherein said pointed position detecting section selects from said first storage section a first image which is an image to be projected onto said projection target in said predetermined timing, then subtracts an image signal of said second image from an image signal of said first image, and thereby detects the position pointed by said pointing device.

A 7th aspect of the present invention is a projector system according to the 6th aspect of the present invention, wherein said pointing device has a transmission section of transmitting a predetermined trigger signal in response to an external operation in said predetermined timing, and wherein when said predetermined trigger signal is transmitted from said pointing device, said pointed position detecting section receives said predetermined trigger signal and thereby specifies said predetermined timing.

A 8th aspect of the present invention is a projector system according to the 6th aspect of the present invention, wherein said pointing device has a pulse modulation section of modulating laser light projected by said laser irradiation section, into predetermined pulses in response to an external operation in said predetermined timing, wherein said image pick-up section has a demodulation section of demodulating an image of said pulse-modulated laser light, and wherein said first projection section displays an image on said projection target on the basis of the position detected by said pointed position detecting section and a signal detected by said demodulation section, or alternatively on the basis of the signal detected by said demodulation section.

A 9th aspect of the present invention is a projector system according to the 1st aspect of the present invention, wherein said image pick-up section picks up a first image which is an image projected onto said projection target in a predetermined timing, and wherein said pointed position detecting section selects said first picked-up image on the basis of the luminance, thereby generates a second image constructed from an image signal having a luminance higher than a predetermined value, and then detects the position pointed by said pointing device on the basis of a position of a part having the highest luminance within said second image.

A 10th aspect of the present invention is a projector system according to the 1st aspect of the present invention, wherein said first projection section projects an image of the position detected by said pointed position detecting section onto said projection target in an expanded or reduced state.

A 11th aspect of the present invention is a projector system according to the 1st aspect of the present invention, wherein said image information contains an operation display area of pointing a predetermined operation, and wherein when said operation display area is pointed by said pointing device, said first projection section projects an image corresponding to said predetermined operation onto said projection target.

A 12th aspect of the present invention is a projector system according to the 1st aspect of the present invention, wherein in said first projection section, at each time when an image is projected onto said projection target, a position where said image is to be displayed is calibrated.

A 13th aspect of the present invention is an image projection method comprising:

a projecting step of projecting inputted image information onto a projection target;

a pointing step of at least pointing to a predetermined part of an image projected onto said projection target;

a recognition step of recognizing said image pointed to said pointing step;

a pointed position detecting step of detecting a position of the part pointed to at said pointing step, on the basis of image information recognized at said recognition step; and an image correction step of correcting said image information on the basis of the position of the part at least pointed to at said pointing step, wherein said first projecting step comprises a step of projecting a corrected image on the basis of the position of the part at least pointed to at said pointing step and detected at said pointed position detecting step.

A 14th aspect of the present invention is a projector unit comprising:

a first projection section of projecting inputted image information onto a projection target;

a recognition section of recognizing at least said image pointed to by a pointing device of pointing a predetermined part of an image projected onto said projection target;

a pointed position detecting section of detecting a position of the part pointed to by said pointing device, on the basis of image information recognized by said recognition section; and an image correction section of correcting said image information on the basis of the position of the part at least pointed to by said pointing device, wherein said first projection section projects at least an image corrected on the basis of the position of the part pointed to by said pointing device and detected by said pointed position detecting section.

A 15th aspect of the present invention is a program of causing a computer to serve as the pointed position detecting section of detecting a position of the part pointed to by said pointing device, on the basis of image information picked up by said image pick-up section, in the projector system of the first present invention.

A 16th aspect of the present invention is a computer-processible recording medium carrying the program of the 15th aspect of the present invention.

A 17th aspect of the present invention is a projector system comprising:

a scanning signal generating section of generating a scanning signal;

a superposing section of superposing said inputted image information and said scanning signal;

a first projection section of projecting onto a projection target a signal superposed by said superposing section;

a pointing section provided with a light-receiving element of receiving light emitted from a predetermined part of said superposed image; and a pointed position detecting section of detecting a position pointed to by said pointing section, on the basis of said scanning signal and a signal from said light-receiving element.

An 18th aspect of the present invention is a projector system according to the 17th present invention, wherein said light-receiving element is a CCD.

A 19th aspect of the present invention is a projector system according to the 17th aspect of the present invention, wherein said first projection section further projects predetermined identification information onto the position detected by said pointed position detecting section on the image projected onto said projection target.

A 20th aspect of the present invention is a projector system according to the 17th aspect of the present invention, wherein said scanning signal is a scanning signal which is caused to scan over the entire image projected onto said projection target, and which generates a luminance permitting distinction from an image formed from said inputted image information, when projected by said first projection section.

A 21st aspect of the present invention is a projector system according to the 17th aspect of the present invention, wherein said pointed position detecting section detects a time from a predetermined timing of said scanning signal to a time point that said scanning signal is displayed at the position pointed to by said pointing section, and thereby detects the position on said image pointed to by said pointing section.

A 22nd aspect of the present invention is a projector system according to the 17th aspect of the present invention, wherein said scanning signal is transmitted by wireless, wherein said pointing section comprises a reception section of receiving said transmitted scanning signal and a transmission section of transmitting a signal inputted from said light-receiving element, and wherein said signal transmitted from said pointing section can be received.

A 23rd aspect of the present invention is a projector system according to the 19th aspect of the present invention, further comprising an averaging circuit of averaging the position detected by said pointed position detecting section over a predetermined time, wherein said first projection section projects identification information onto said averaged position outputted from said averaging circuit.

A 24th aspect of the present invention is a projector system according to the 23rd aspect of the present invention, wherein said predetermined time is such a length that said identification information displayed on said image is seen without blurring.

A 25th aspect of the present invention is a projector according to the 17th aspect of the present invention, wherein said first projection section projects at least an image corrected on the basis of a position of the part pointed to by said pointing section and detected by said pointed position detecting section.

A 26th aspect of the present invention is a projector system comprising:

a first projection section of projecting inputted image information onto a projection target;

a scanning signal generating section of generating a scanning signal;

a second projection section of projecting onto said projected image the scanning signal generated by said scanning signal generating section;

a pointing section provided with a light-receiving element of receiving light emitted from a predetermined part of said superposed image; and a pointed position detecting section of detecting a position pointed to by said pointing section, on the basis of said scanning signal and a signal from said light-receiving element.

A 27th aspect of the present invention is a projector system according to the 26th aspect of the present invention, wherein said light-receiving element is a CCD.

A 28th aspect of the present invention is a projector system according to the 26th aspect of the present invention, wherein said first projection section or said second projection section further projects predetermined identification information onto the position detected by said pointed position detecting section on the image projected onto said projection target.

A 29th aspect of the present invention is a projector system according to the 26th aspect of the present invention, wherein said scanning signal is a scanning signal which is caused to scan over the entire image projected onto said projection target, and which generates a luminance permitting distinction from an image formed from said inputted image information, when projected by said first projection section or said second projection section.

A 30th aspect of the present invention is a projector system according to the 26th aspect of the present invention, wherein said pointed position detecting section detects a time from a predetermined timing of said scanning signal to a time point that said scanning signal is displayed at the position pointed by said pointing section, and thereby detects the position on said image pointed to by said pointing section.

A 31st aspect of the present invention is a projector system according to the 26th aspect of the present invention, wherein said scanning signal is transmitted by wireless, wherein said pointing section comprises a reception section of receiving said transmitted scanning signal and a transmission section of transmitting a signal inputted from said light-receiving element, and wherein said signal transmitted from said pointing section can be received.

A 32nd aspect of the present invention is a projector system according to the 28th aspect of the present invention, further comprising an averaging circuit of averaging the position detected by said pointed position detecting section over a predetermined time, wherein said first projection section or said second projection section projects identification information onto said averaged position outputted from said averaging circuit.

A 33rd aspect of the present invention is a projector system according to the 32nd aspect of the present invention, wherein said predetermined time is such a length that said identification information displayed on said image is seen without blurring.

A 34th aspect of the present invention is a projector system according to the 26th aspect of the present invention, wherein said first projection section or said second projection section projects at least an image corrected on the basis of the position of the part pointed to by said pointing section and detected by said pointed position detecting section.

A 35th aspect of the present invention is a pointing section comprising a light-receiving element of receiving light emitted from a predetermined part of an image on which a signal, in which a generated scanning signal is superposed onto inputted image information, is projected, wherein a pointed position detecting section detects a position pointed to by said pointing section, on the basis of said scanning signal and a signal from said light-receiving element.

A 36th aspect of the present invention is an image projection method comprising:

a scanning signal generating step of generating a scanning signal;

a superposing step of superposing said inputted image information and said scanning signal;

a second projecting step of projecting a signal superposed at said superposing step;

a pointing step provided with a light-receiving element of receiving light emitted from a predetermined part of said superposed image; and a pointed position detecting step of detecting a position pointed to at said pointing step, on the basis of said scanning signal and a signal from said light-receiving element.

A 37th aspect of the present invention is a program of causing a computer to serve as the pointed position detecting section of detecting a position pointed to by said pointing section, on the basis of said scanning signal and a signal from said light-receiving element, in the projector system of the 17th aspect of the present invention.

A 38th aspect of the present invention is a computer-processible recording medium carrying the program of the 37th aspect of the present invention.

A 39th aspect of the present invention is an apparatus control system comprising:

a plurality of information terminals each having an individual identification number; and an identification number recording section of recording the identification number of said information terminal in response to an access from each of said information terminals, whereby operation is accepted solely from an information terminal having an identification number selected from the identification numbers recorded in said identification number recording section.

A 40th aspect of the present invention is an apparatus control system comprising:

a plurality of information terminals each having an individual identification number, an identification number recording section of recording the identification number of said information terminal in response to an access from each of said information terminals; and a selecting section of selecting a predetermined information terminal from said identification number recording section on the basis of a rule determined in advance, whereby operation is accepted solely from an information terminal having an identification number selected from the identification numbers recorded in said identification number recording section.

A 41st aspect of the present invention is an apparatus control system according to the 39th aspect of the present invention, wherein said information terminal can transmit and receive data to and from a control object apparatus which incorporates said identification number recording section.

A 42nd aspect of the present invention is an apparatus control system according to the 40th aspect of the present invention, wherein said information terminal can transmit and receive data to and from a control object apparatus which incorporates said identification number recording section.

A 43rd aspect of the present invention is an apparatus control system according to the 41st aspect of the present invention, wherein said information terminal and said control object apparatus are connected through a private line.

A 44th aspect of the present invention is an apparatus control system according to the 42nd aspect of the present invention, wherein said information terminal and said control object apparatus are connected through a private line.

A 45th aspect of the present invention is an information terminal having an individual identification number, wherein said information terminal comprises an identification number recording section of recording an identification number of another information terminal in response to an access from said another information terminal, whereby an object apparatus is controlled from an information terminal having an identification number selected from the identification numbers recorded in said identification number recording section.

A 46th aspect of the present invention is an apparatus control method of controlling operation from a plurality of information terminals each having an individual identification number, said method comprising the steps of:

recording the identification number of said information terminal in response to an access from each of said information terminals; and accepting operation solely from an information terminal having an identification number selected from the identification numbers recorded at said identification number recording step.

A 47th aspect of the present invention is a program of causing a computer to serve as the identification number recording section of recording the identification number of said information terminal in response to an access from each of said information terminals, in the apparatus control system of the 39th aspect of the present invention.

A 48th aspect of the present invention is a computer-processible recording medium carrying the program of the 47th aspect of the present invention.

The present invention provides a projector system and an image projection method which allow not solely a presenter but also an audience person to operate image display.

Further, the present invention provides an apparatus control system, an apparatus control method, and an information terminal in which even when operation is performed from a plurality of information terminals, information seldom suffers from confusion.

Figure 1:
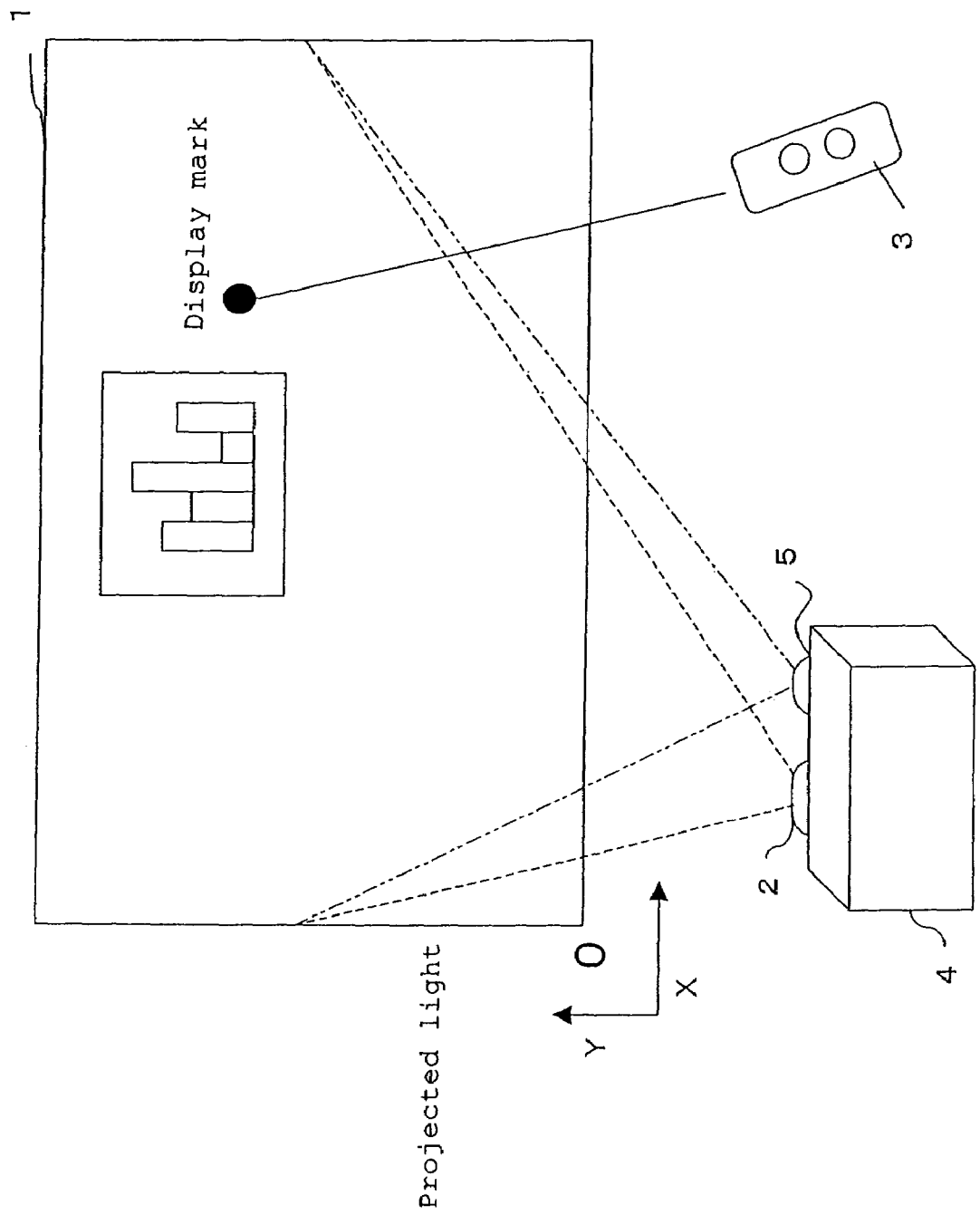
FIG. 1 is a perspective view showing a schematic configuration of a projector system according to Embodiment 1 of the present invention.

DESCRIPTION OF REFERENCE NUMERALS 1, 101, 201 Screen
2 Projection lens
3, 30, 40 Laser pointer
4 Projector unit
5 Detection lens
6 Projector circuit
7 Detection camera circuit
8, 12 A/D converter
9, 11 Frame memory
10 Image comparison circuit
13, 406, 416, 426 CPU
14 Video input terminal
15 Coordinate position detection circuit
17 Laser light emission push button
18, 218 Zoom magnification factor change button
19, 219 Usage priority request button
20 Laser irradiation surface
21, 32, 232 Antenna
22, 31 Transmission and reception circuit
23 Image magnifying circuit
25 GUI display control circuit
27 Luminance filter
28 Demodulation circuit
29 Laser irradiation section
34 Laser modulation circuit
33, 35, 233, 402, 433 Control circuit
36 Forward page feed button
37 Backward page feed button
38 Image expansion button
39 Image reduction button
41 List display button
202, 242 Projection lens
203 Hand-held device
204 Projector unit
205 Detection lens
206, 231 Transmission and reception unit
207 Arrow mark generator
208 Timing comparison section
209 Luminance signal generator
210, 310 Signal circuit
211 Superposing section
213, 243 Light valve
215 Personal computer
216 Main body
217 Position confirmation push button
220 Detection surface
229 CCD
204 Averaging circuit
401 Operation and setting section
403 Portable telephone
404, 414, 424 Memory
405 Projector unit
407, 436 Infrared sensor
408 Cross key
409 Display screen
410 Numerical keypad
427, 434 Infrared irradiation section
435 Operation and setting section
438 Communication interface

DETAILED DESCRIPTION OF THE INVENTION

Embodiment 1

FIG. 1 shows a schematic configuration of a projector system according to Embodiment 1 of the present invention.

In the projector system shown in FIG. 1, a projector unit 4 is provided with a projection lens 2 and a detection lens 5. A screen 1 serving as an example of the projection target of the present invention is arranged in a manner opposing to the projection lens 2 and the detection lens 5. A laser pointer 3 serving as an example of the pointing section of the present invention is arranged such as to project light toward the screen 1 when switched ON. The detection lens 5 is arranged in a manner adjusted such that the entire image projected on the screen 1 can be acquired.

Figure 2:
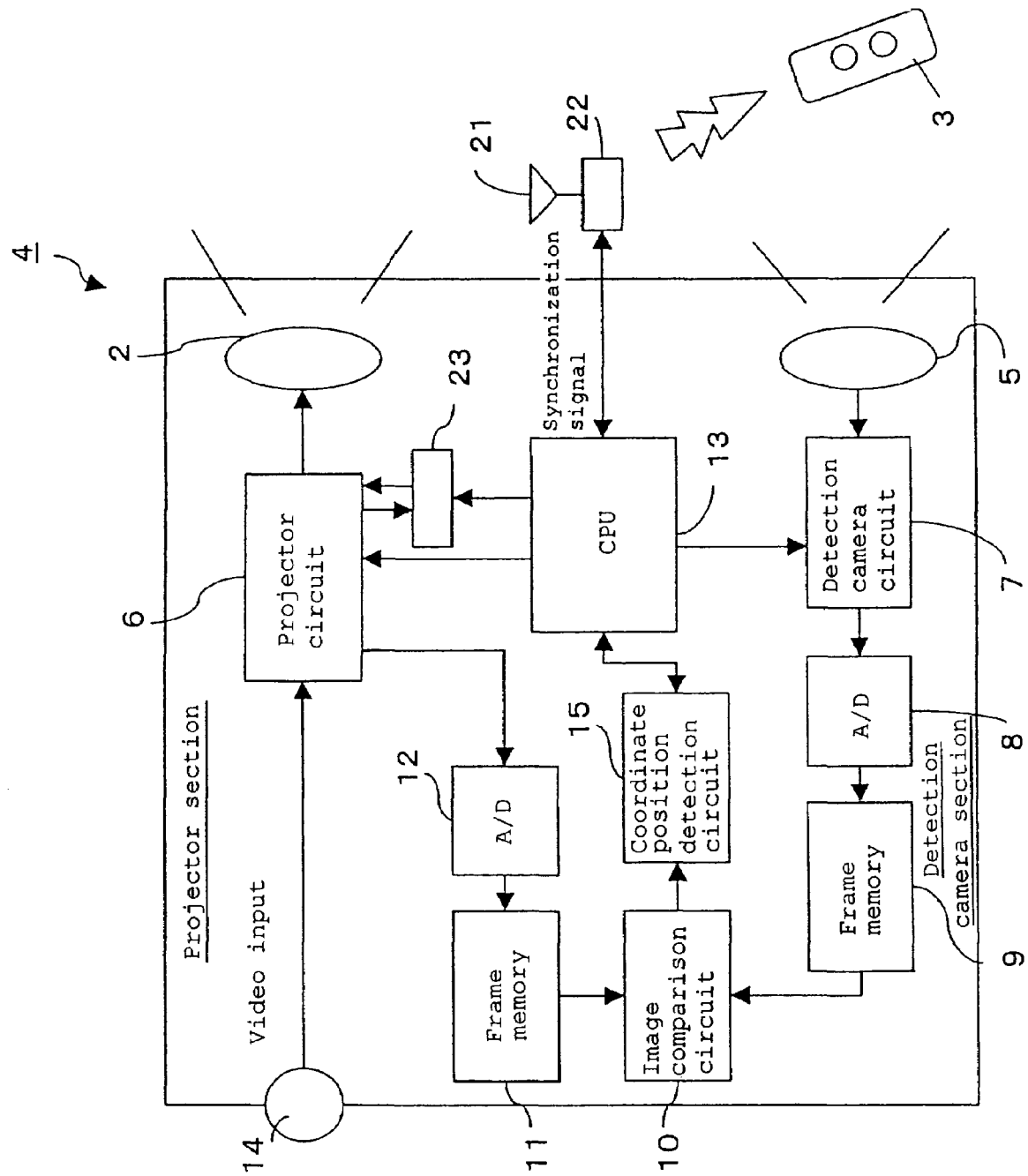
FIG. 2 is a block diagram showing an internal configuration of a projector system according to Embodiment 1 of the present invention.

FIG. 2 is a block diagram showing an internal configuration of the projector unit 4.

In the projector unit 4 shown in FIG. 2, a projector circuit 6 connected to a video input terminal 14 is arranged behind the projection lens 2. The projector circuit 6 includes a liquid crystal display element. Behind this liquid crystal display element, a light source (not shown) and a predetermined optical system are arranged and adjusted such that light emitted from the light source should be projected onto the screen 1 via the optical system, the liquid crystal display element, and the projection lens 2. An input side of the projector circuit 6 is connected to the video input terminal 14 of inputting a video signal.

A detection camera circuit 7 is arranged behind the detection lens 5. An output side of the detection camera circuit 7 is connected to an input side of an A/D converter 8. The detection camera circuit 7 includes a photodetector (not shown). This photo detector is arranged and adjusted such that light having passed the detection lens 5 should be detected by this photo detector. An output side of the A/D converter 8 is connected to a frame memory 9 serving as an example of the second storage section of the present invention. The frame memory 9 is connected to one input side of an image comparison circuit 10. The other input side of the image comparison circuit 10 is connected to a frame memory 11 serving as an example of the first storage section of the present invention. The frame memory 11 is connected to an output side of an A/D converter 12. An input side of the A/D converter 12 is connected to a projector circuit 6. The projector circuit 6 is connected to an input side and an output side of an image magnifying circuit 23 serving as an example of the image correction section of the present invention.

In this configuration, the video input terminal 14, the projector circuit 6, the frame memory 11, the A/D converter 12, the image magnifying circuit 23, and the projection lens 2 correspond to an example of the first projection section of the present invention. Further, the detection lens 5, the detection camera circuit 7, the A/D converter 8, and the frame memory 9 correspond to an example of the image pick-up section of the present invention.

An output side of the image comparison circuit 10 is connected to a coordinate position detection circuit 15. The coordinate position detection circuit 15 is connected to a CPU 13. The CPU 13 is connected to the detection camera circuit 7, the projector circuit 6, and the image magnifying circuit 23. The CPU 13 is further connected to a transmission and reception circuit 22 and an antenna 21 serving as an example of the transmission section of the present invention. The antenna 21 can transmit a predetermined signal of the CPU 13 to the laser pointer 3, and receive a predetermined signal from the laser pointer 3. The CPU 13, the image comparison circuit 10, and the coordinate position detection circuit 15 correspond to an example of the pointed position detecting section in the projector system of the first aspect of the present invention.

Figure 3:
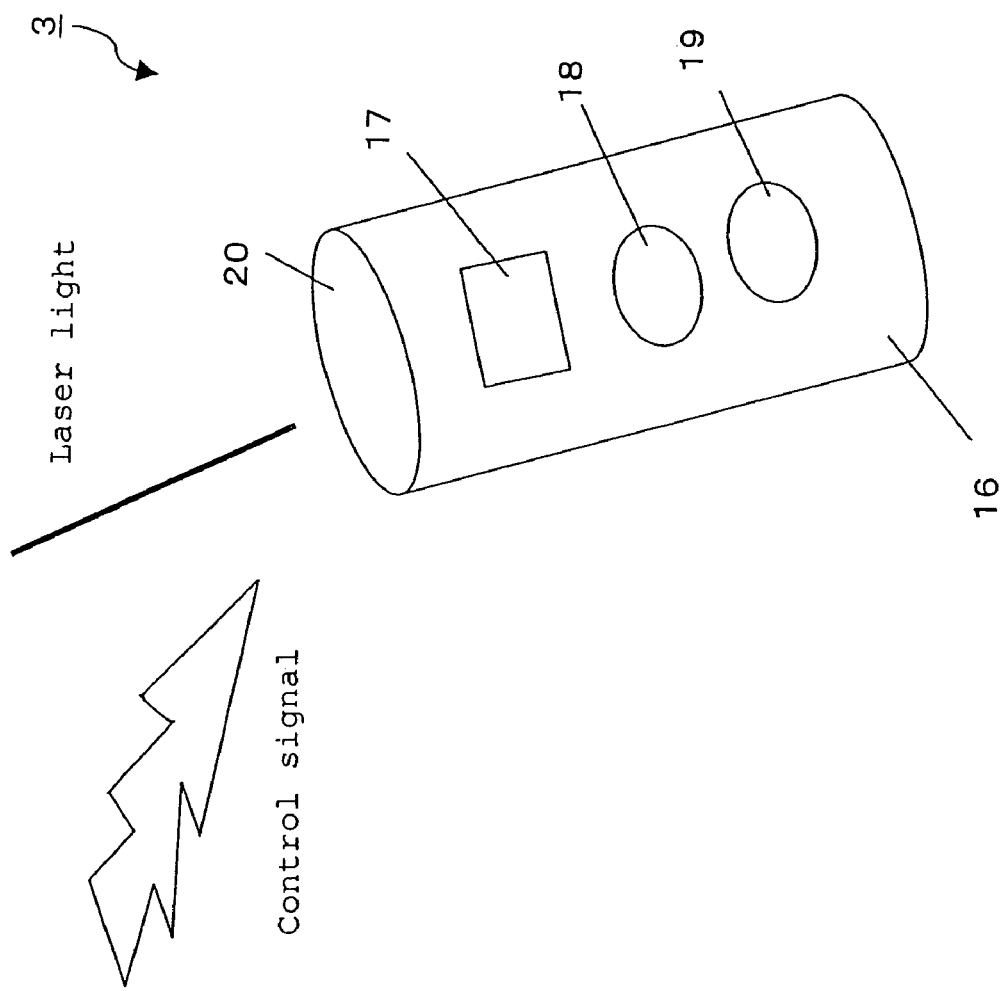
FIG. 3 is a perspective view showing a general appearance of a laser pointer used in Embodiments 1-3 of the present invention.

FIG. 3 is a perspective view showing a general appearance of the laser pointer 3 serving as an example of the pointing device of the present invention. In the laser pointer 3, a main body 16 comprises a laser light emission push button 17, a zoom magnification factor change button 18, and a usage priority request button 19. The laser light emission push button 17 has the functions of a half push state and a full push state.

Figure 5:
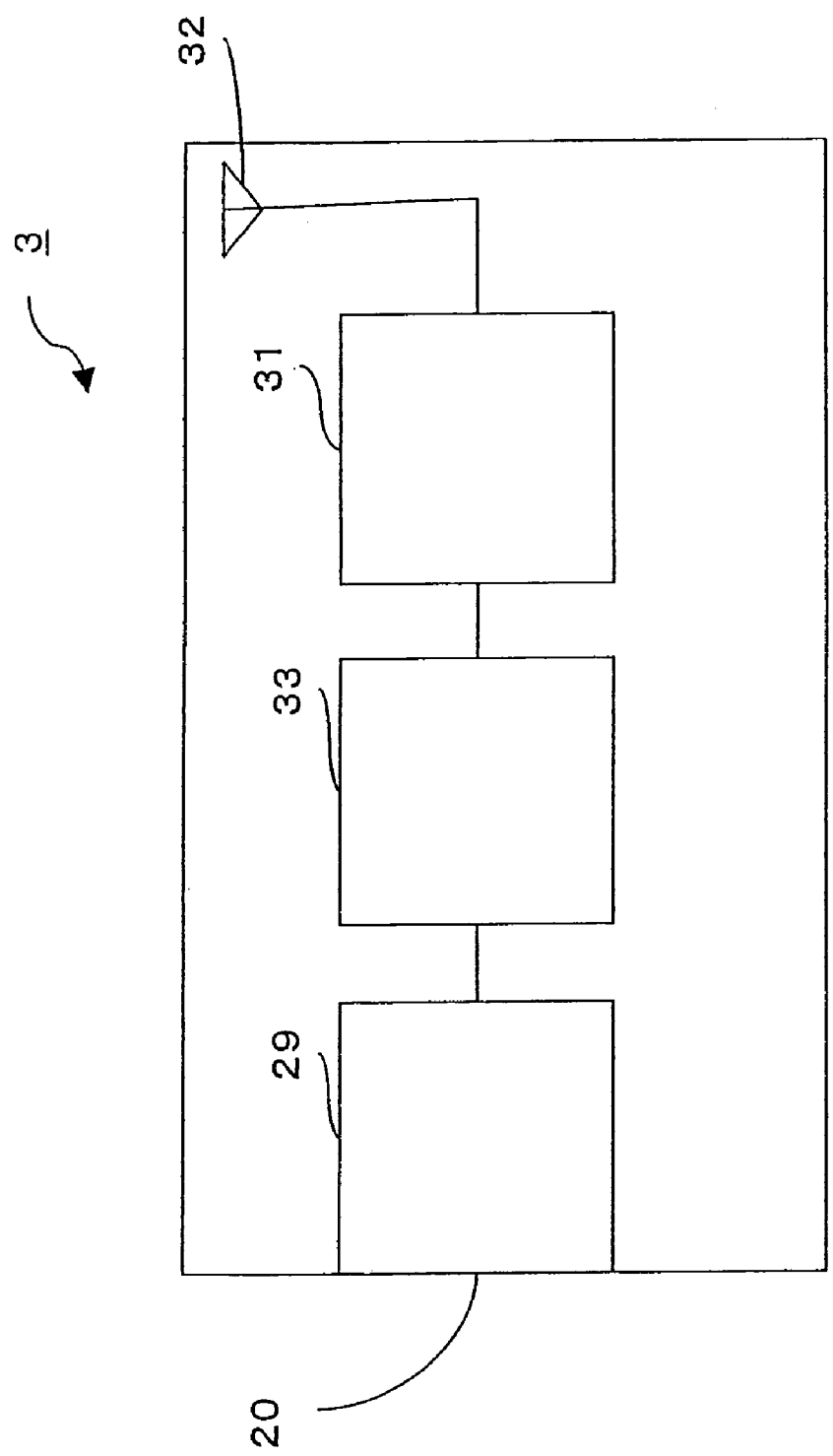
FIG. 5 is a block diagram showing an internal configuration of a laser pointer used in a projector system according to Embodiments 1-3 of the present invention.

FIG. 5 is a block diagram showing an internal configuration of the laser pointer 3. As shown in FIG. 5, the laser pointer 3 comprises in its inside a laser irradiation section 29 of generating and projecting laser light, a control circuit 33 of controlling the laser irradiation section 29, a transmission and reception circuit 31 of transmitting a signal generated in the control circuit 33 and receiving a signal transmitted from the projector unit 4, and an antenna 32 connected to the transmission and reception circuit 31. The transmission and reception circuit 31 and the antenna 32 correspond to an example of the transmission section of the present invention.

The control circuit 33 is connected to the laser light emission push button 17, the zoom magnification factor change button 18, and the usage priority request button 19. This control circuit 33 performs predetermined control in response to an operation of these buttons, and thereby outputs a predetermined command to the laser irradiation section 29 or the transmission and reception circuit 31.

Next, the operation of the projector system having the above-mentioned configuration is described below.

A video signal inputted through the video input terminal 14 is inputted to the projector circuit 6. Then, processing necessary for the projection onto the screen 1 is performed in the projector circuit 6. The image information converted into optical information is projected onto the screen 1 via the projection lens 2. On the other hand, at the same time of projection onto the screen 1, in the projector circuit 6, the image information to be projected onto the screen 1 is A/D-converted in the A/D converter 12, and then stored into the frame memory 11 successively.

In a state that the image is projected onto the screen 1, when, for example, an audience person directs the laser pointer 3 to the screen 1, and then pushes the laser light emission push button 17 into a half push state. Then, the control circuit 33 outputs a command to the laser irradiation section 29, so that laser light is generated in the laser irradiation section 29 and then the laser light is projected from the laser projection surface 20 to the screen 1.

The laser light projected from the laser pointer 3 is superposed on the image projected from the projection lens 2, and thereby displayed as a luminance point on the screen 1. The audience person changes the direction of the laser pointer 3 so that the luminance point will move to a desired location on the screen 1.

On the other hand, the image projected on the screen 1 is acquired to the detection camera circuit 7 via the detection lens 5. Then, the acquired image signal is A/D-converted and then stored into the frame memory 9 successively. At that time, in each image displayed on the screen 1, point O at the lower left corner, for example, is recognized as a reference coordinate point.

When the audience person desires to expand a part of the image displayed on the screen 1, the audience person moves the luminance point to the part to be expanded, and then pushes deeper the laser light emission push button 17 into a full push state. When the laser light emission push button 17 goes into a full push state, the control circuit 33 generates a trigger signal. The generated trigger signal is outputted to the transmission and reception circuit, and then transmitted from the laser pointer 3 via the antenna 32. The timing that the laser light emission push button 17 is pushed into a full push state corresponds to an example of the predetermined timing in the projector system of the sixth aspect of the present invention.

The transmitted trigger signal is received by the antenna 21 in the projector unit 4, and then transmitted to the CPU 13 via the transmission and reception circuit 22. The trigger signal transmitted to the CPU 13 is immediately transmitted to the projector circuit 6 and the detection camera circuit 7. On receiving the trigger signal, the detection camera circuit 7 adds trigger information to the image information (corresponding to an example of the second image in the projector system of the sixth aspect of the present invention) acquired through the detection lens 5 at that time. On the other hand, on receiving the trigger signal, the projector circuit 6 adds trigger information to a signal (corresponding to an example of the first image in the projector system of the sixth aspect of the present invention) to be transmitted to the A/D converter 12 at that time.

The CPU 13 outputs image information provided with the trigger information, from the image information stored in the frame memory 9 and the frame memory 11, and then inputs the information to the image comparison circuit 10. In the image comparison circuit 10, the image information stored in the frame memory 11 is subtracted from the image information stored in the frame memory 9. As a result of this subtraction process, a difference image is acquired between the image projected onto the screen 1 via the projection lens 2 and the image acquired via the detection lens 5. That is, an image is solely obtained that contains the luminance point pointed with the laser pointer 3. The image information having undergone the subtraction process in the image comparison circuit 10 is transmitted to the coordinate position detection circuit 15. Then, the coordinates of the luminance point generated by the laser pointer 3 are calculated on the basis of the reference coordinates obtained as described above. The calculated coordinates of the luminance point are transmitted to the CPU 13.

After pushing the laser light emission push button 17 into a full push state, the audience person operates the zoom magnification factor change button 18. In the zoom magnification factor change button 18, a signal (referred to as a zoom signal, hereafter) is generated such that, for example, the zoom magnification factor increases with increasing time of pushing the button. The generated zoom magnification factor signal is transmitted via the antenna 32. The zoom signal received through the antenna 21 of the projector unit 4 is inputted to the CPU 13 via the transmission and reception circuit 22. The zoom signal inputted to the CPU 13 is transmitted to the image magnifying circuit 23.

When the zoom signal is inputted from the CPU 13, the image magnifying circuit 23 causes the video signal having inputted to the projector circuit 6 to be inputted into the image magnifying circuit 23. Then, the above-mentioned video signal is expanded by a magnification factor corresponding to the predetermined zoom signal, for example, centered at the coordinates of the luminance point. After that, the signal is returned as image information to be projected, to the projector circuit 6. When the expanded video signal is inputted, in place of the video signal inputted through the video input terminal 14, the projector circuit 6 displays the above-mentioned expanded video information transmitted from the image magnifying circuit 23, as image information onto the screen 1 via the projection lens 2. In this case, the reference coordinates of the expanded image is recognized, for example, as the lower left corner of the expanded image. Thus, also in this expanded image, when the luminance point generated by the laser pointer 3 is moved to a desired location, and then an operation similar to the above-mentioned one is performed, a further expanded image is obtained on the screen 1.

Figure 4:
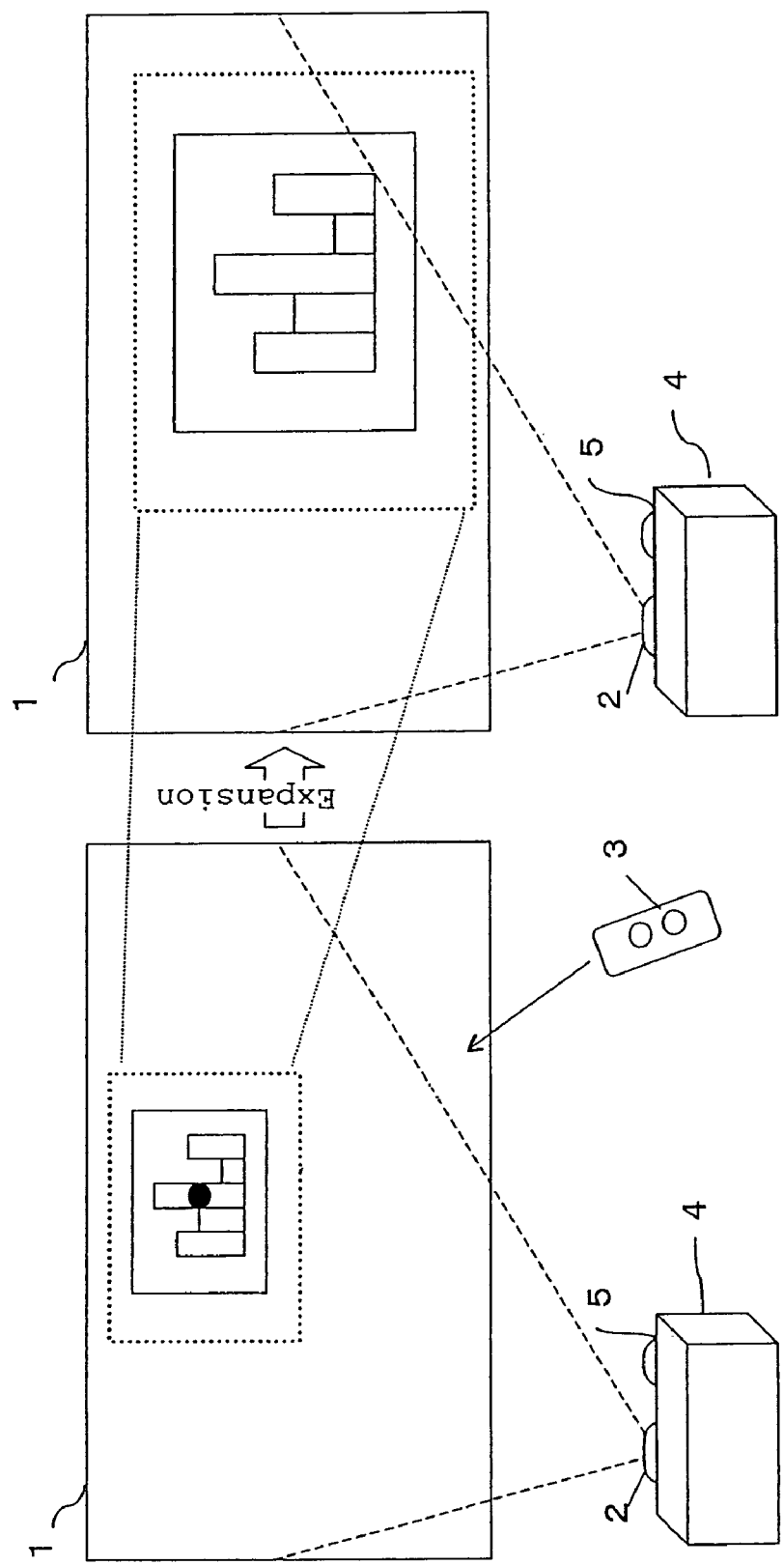
FIG. 4 is a schematic diagram showing the situation of operation of a projector system according to Embodiment 1 of the present invention.

FIG. 4 is a schematic diagram showing a situation that an image is expanded by the above-mentioned operation.

When the audience person desires to return the above-mentioned expanded image displayed on the screen 1 into the original image, for example, a full push state of the laser light emission push button 17 is released so that the transmission of the zoom signal is stopped. Then, the video signal inputted through the video input terminal 14 is projected from the projector circuit 6 through the projection lens 2 onto the screen 1, without going via the image magnifying circuit 23.

By virtue of the above-mentioned operation, when operating the laser pointer 3, even an audience person can expand and display arbitrarily a desired part of the image displayed on the screen 1. This avoids such work that the audience person orally tells the presenter the part desired to be expanded, and that the presenter performs an expansion operation for the image. This provides a user-friendly projector system.

Embodiment 2

Figure 6:
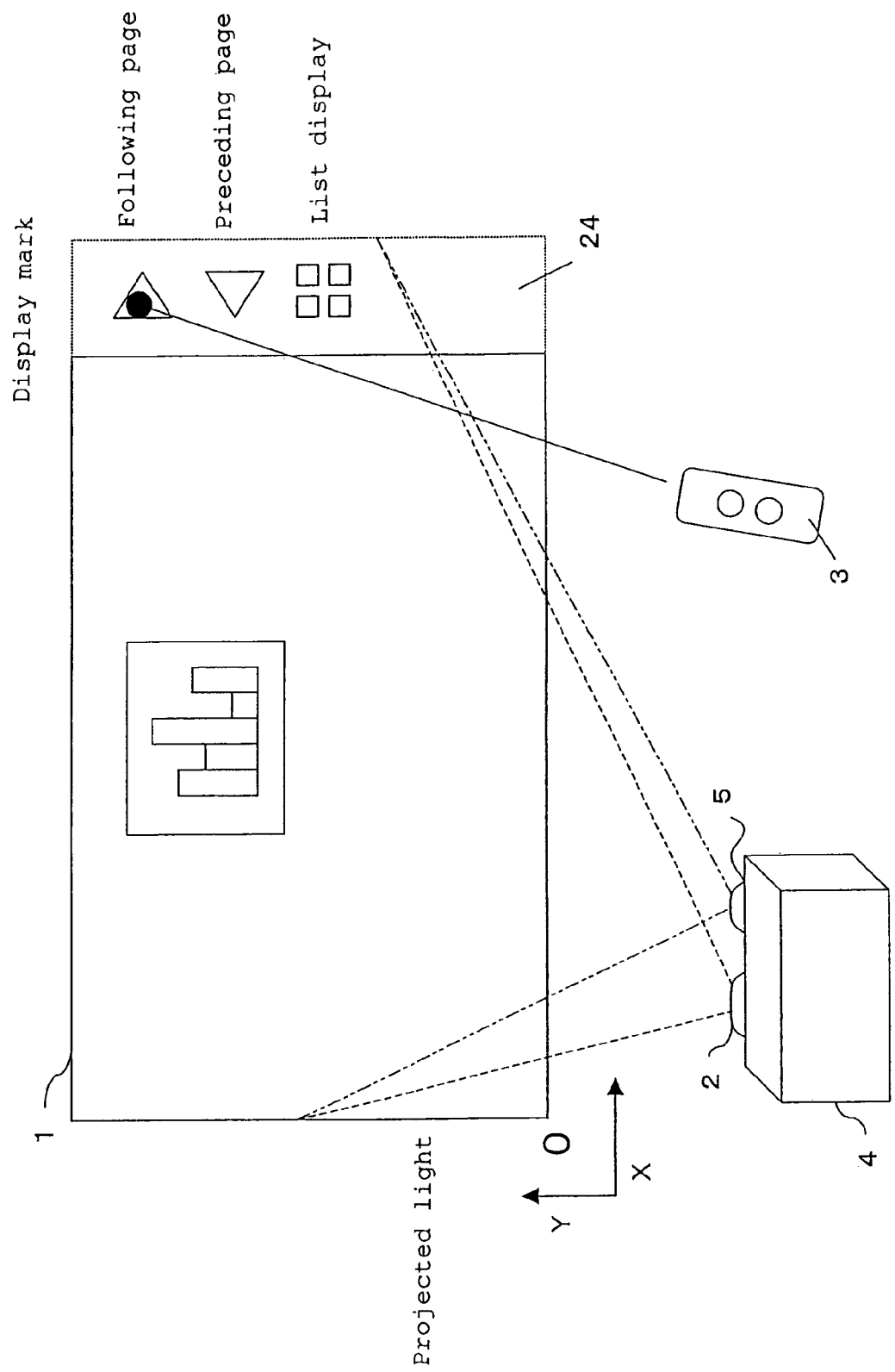
FIG. 6 is a perspective view showing a schematic configuration of a projector system according to Embodiment 2 of the present invention.

FIG. 6 shows a schematic configuration diagram of a projector system according to Embodiment 2. The structure of the projector system according of Embodiment 2 is similar to that of the projector system of Embodiment 1, and hence its description is omitted. In the projector system of Embodiment 2, as shown in FIG. 6, a GUI (Graphic User Interface) display area 24 serving as an example of the operation display area of the present invention is displayed on the screen 1, in a manner added to the video signal inputted through the video input terminal 14. In the GUI display area 24 of the example shown in FIG. 6, a forward page feed mark, a backward page feed mark, and a list display mark are displayed.

Figure 7:
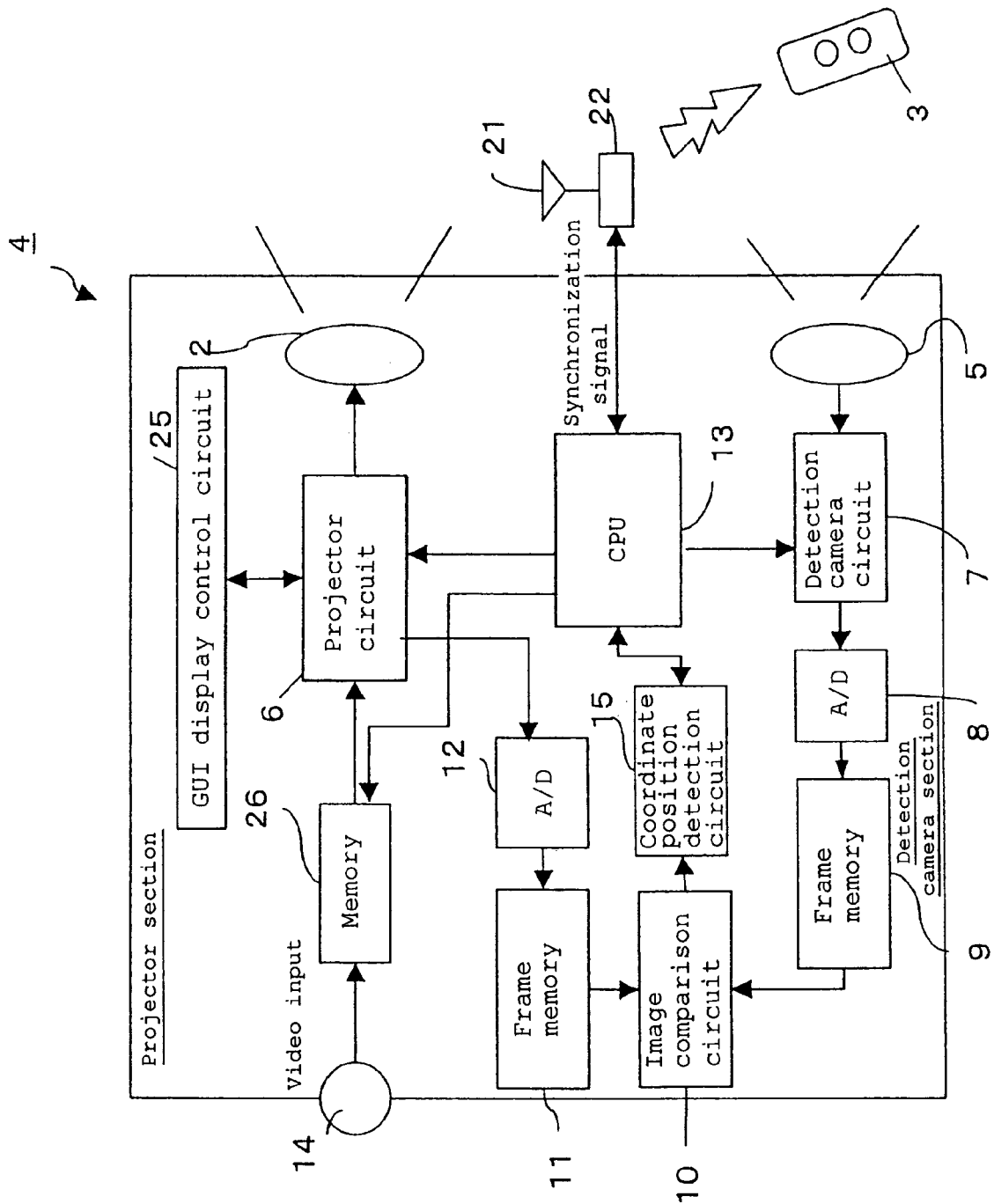
FIG. 7 is a block diagram showing an internal configuration of a projector system according to Embodiment 2 of the present invention.

FIG. 7 is a block diagram showing the configuration that realizes display on the screen 1. In the block diagram of FIG. 7, like components to those of the projector system of Embodiment 1 are designated by like reference numerals, and hence their description is omitted.

The differences in the configuration of the projector system of the present embodiment from that of the projector system of Embodiment 1 are as follows. In place of connecting to the image magnifying circuit 23, the projector circuit 6 is connected to a GUI display control circuit 25 serving as an example of the image correction section of the present invention. Further, a memory 26 is arranged between the video input terminal 14 and the projector circuit 6.

In the present embodiment, the video input terminal 14, the memory 26, the projector circuit 6, and the projection lens 2 correspond to an example of the first projection section of the present invention.

Next, the operation of the projector system of the present embodiment having the above-mentioned configuration is described below.

The video signal inputted through the video input terminal 14 is inputted to the projector circuit 6, and at the same time, accumulated in the memory 26. In the projector circuit 6, processing necessary for the projection onto the screen 1 is performed. The image information converted into optical information is projected onto the screen 1 via the projection lens 2. On the other hand, the GUI display control circuit 25 generates an image signal corresponding to the GUI display area 24 determined in advance, and then transmits the signal to the projector circuit 6. The projector circuit 6 combines the image signal corresponding to the GUI display area 24 inputted from the GUI display control circuit 25 with a video information signal transmitted from the memory 26. At that time, this combining is performed such that the GUI display area 24 should be displayed on the right-hand side of the image of the video information on the screen 1.

In the projector circuit 6, at the same time of projection onto the screen 1, the above-mentioned combined image information to be projected onto the screen 1 is A/D-converted in the A/D converter 12, and then stored into the frame memory 11 successively.

Similarly to the projector system of Embodiment 1, the audience person operates the laser pointer 3, and thereby moves the luminance point generated by laser light to a desired location on the screen 1. At that time, when the audience person desires to display the preceding image, the audience person moves the luminance point to the preceding page mark in the GUI display area 24. Then, the audience person pushes the laser light emission push button 17 of the laser pointer 3 into a full push state.

When the laser light emission push button 17 goes into a full push state, the trigger generation circuit generates a trigger signal. The generated trigger signal is transmitted from the laser pointer 3 via the transmission and reception circuit 31 and the antenna 32.

As a result of an operation similar to that of Embodiment 1, the transmitted trigger signal is immediately transmitted to the projector circuit 6 and the detection camera circuit 7. Then, when the coordinates of the luminance point are detected by the coordinate position detection circuit 15, the CPU 13 recognizes that the above-mentioned detected coordinates are located on the preceding page mark in the GUI display area 24. Then, from among the image information accumulated in the memory 26, the CPU 13 outputs the image information of the preceding page to the projector circuit 6. Then, in place of the video information inputted through the video input terminal 14, the projector circuit 6 combines the above-mentioned image information of the preceding page with the above-mentioned GUI display area 24, and then projects the information onto the screen 1 via the projection lens 2.

FIG. 6 shows a state that the laser pointer 3 points the forward page feed mark within the GUI display area 24. In a state that the following page is displayed, when the original image is desired, the luminance point is moved to the backward page feed mark within the GUI display area 24, and then the laser light emission push button 17 is pushed into a full push state. When the list display mark is selected, the images are displayed on the screen 1 in a thumbnail format.

By virtue of the above-mentioned operation, when operating the laser pointer 3, even an audience person can operate and display arbitrarily the image displayed on the screen 1. Further, the operation of the displayed image is achieved without operating a personal computer. This avoids such work that an audience person orally tells the presenter a part desired to be expanded, and that the presenter operates the projector unit 4. This provides a user-friendly projector system.

In the description of the present embodiment given above, the GUI display control circuit 25 has been arranged in place of the image magnifying circuit 23. However, the image magnifying circuit 23 may be arranged in addition to the GUI display control circuit 25. In this case, for example, the audience person first moves to the GUI display area 24 the luminance point of the laser light projected from the laser pointer 3. Then, the audience person pushes the laser light emission push button 17 into a full push state, and thereby confirms a desired mark in the GUI display area 24. Then, after the desired image is displayed on the screen 1, the audience person operates the laser pointer 3, and then moves the luminance point to apart to be expanded within the displayed image. Then, the audience person pushes the laser light emission push button 17 of the laser pointer 3 into a full push state, and thereby confirms the position of the part to be expanded. Then, when the zoom magnification factor change button is operated, a zoom signal is generated, so that similarly to Embodiment 1 described above, an image where the desired part of the image is expand is displayed on the screen 1.

Embodiment 3

Figure 8:
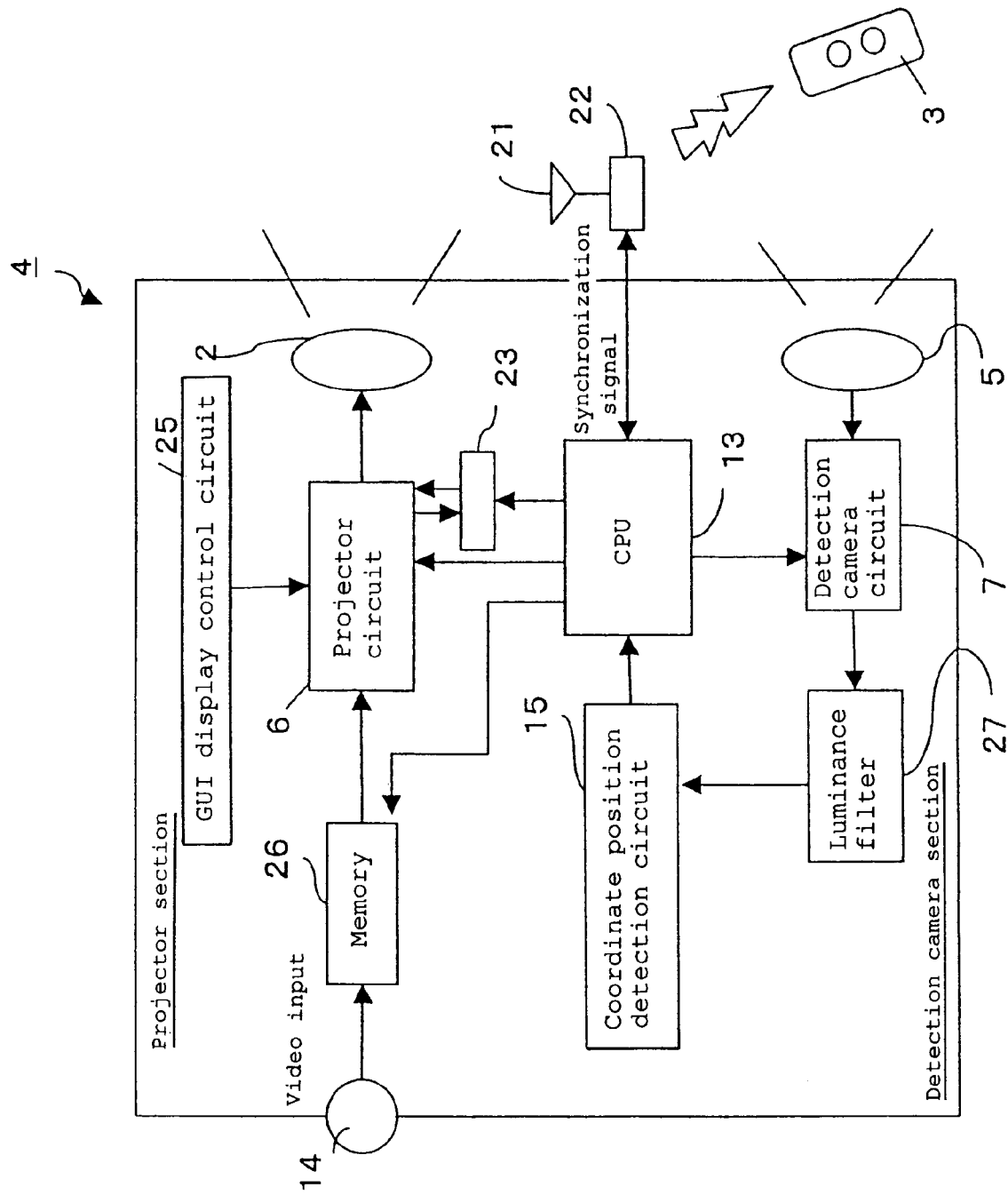
FIG. 8 is a block diagram showing an internal configuration of a projector system according to Embodiment 3 of the present invention.

FIG. 8 is a block diagram showing the configuration of a projector system according to Embodiment 3 of the present invention.

In the projector system shown in FIG. 8, like components to those of the projector system of Embodiments 1 and 2 are designated by like reference numerals, and hence their description is omitted. The projector system of the present embodiment has a luminance filter circuit 27 on the output side of the detection camera circuit 7.

In the present embodiment, the video input terminal 14, the memory 26, the projector circuit 6, and the projection lens 2 correspond to an example of the first projection section of the present invention. The CPU 13 and the coordinate position detection circuit 15 correspond to an example of the pointed position detecting section in the projector system of the first aspect of the present invention. The detection lens 5, the detection camera circuit 7, and the luminance filter circuit 27 correspond to an example of the image pick-up section of the present invention.

Next, the operation of the projector system of the present embodiment is described below.

Similarly to Embodiment 2, a video signal inputted through the video input terminal 14 is accumulated in the memory 26. Then, an image corresponding to the GUI display area 24 is added to the signal. After that, the signal is projected onto the screen 1.

On the other hand, the image projected onto the screen 1 is inputted to the detection camera circuit 7 via the detection lens 5. At that time, an audience person operates the laser pointer 3 and thereby moves the luminance point generated by the laser light projected from the laser pointer 3, to a desired position of the image. When the location to which he desires to move it is confirmed, the audience person pushes the laser light emission push button 17 into a full push state. At that time, a trigger signal is generated and transmitted from the laser pointer 3. The timing that the laser light emission push button 17 is pushed into a full push state corresponds to an example of the predetermined timing in the projector system of the ninth aspect of the present invention.

As a result of an operation similar to that of Embodiments 1 and 2, the transmitted trigger signal is immediately transmitted to the projector circuit 6 and the detection camera circuit 7. At that time, the CPU 13 inputs into the luminance filter circuit 27 the image signal (corresponding to an example of the first image in the projector system of the ninth aspect of the present invention) inputted to the detection camera circuit 7. With regard to the image signal inputted to the luminance filter circuit 27, the luminance filter circuit 27 converts an image signal having a luminance higher than that of the luminance point of the laser light projected by the laser pointer 3, into an image signal of a predetermined gradation. An image signal below the above-mentioned luminance is converted into an image signal of the minimum gradation. That is, the image signal inputted to the luminance filter circuit 27 is outputted as a bi-level signal. A luminance point is outputted at an H value, while the other points are outputted at an L value. The image signal (corresponding to an example of the second image in the projector system of the ninth aspect of the present invention) converted into a bi-level signal as described above is inputted to the coordinate position detection circuit 15.

The coordinate position detection circuit 15 detects the coordinates of a point where the image signal has the H value (a point having the highest luminance). When the coordinates of the luminance point are detected, the CPU 13 recognizes that the above-mentioned detected coordinates are located on the preceding page mark in the GUI display area 24. Then, from among the image information accumulated in the memory 26, the CPU 13 outputs the image information of the preceding page to the projector circuit 6. Then, in place of the video information inputted through the video input terminal 14, the projector circuit 6 combines the above-mentioned image information of the preceding page with the above-mentioned GUI display area 24, and then projects the information onto the screen 1 via the projection lens 2.

Alternatively, when the luminance point is in an area outside the GUI display area 24, the part where the luminance point is located may be expanded and displayed by an operation similar to that of Embodiment 1 described above.

According to the projector system of the present embodiment, the coordinates of the luminance point are detected by means of bi-level processing. This avoids the necessity of a frame memory, and hence reduces the cost.

Embodiment 4

Figure 9:
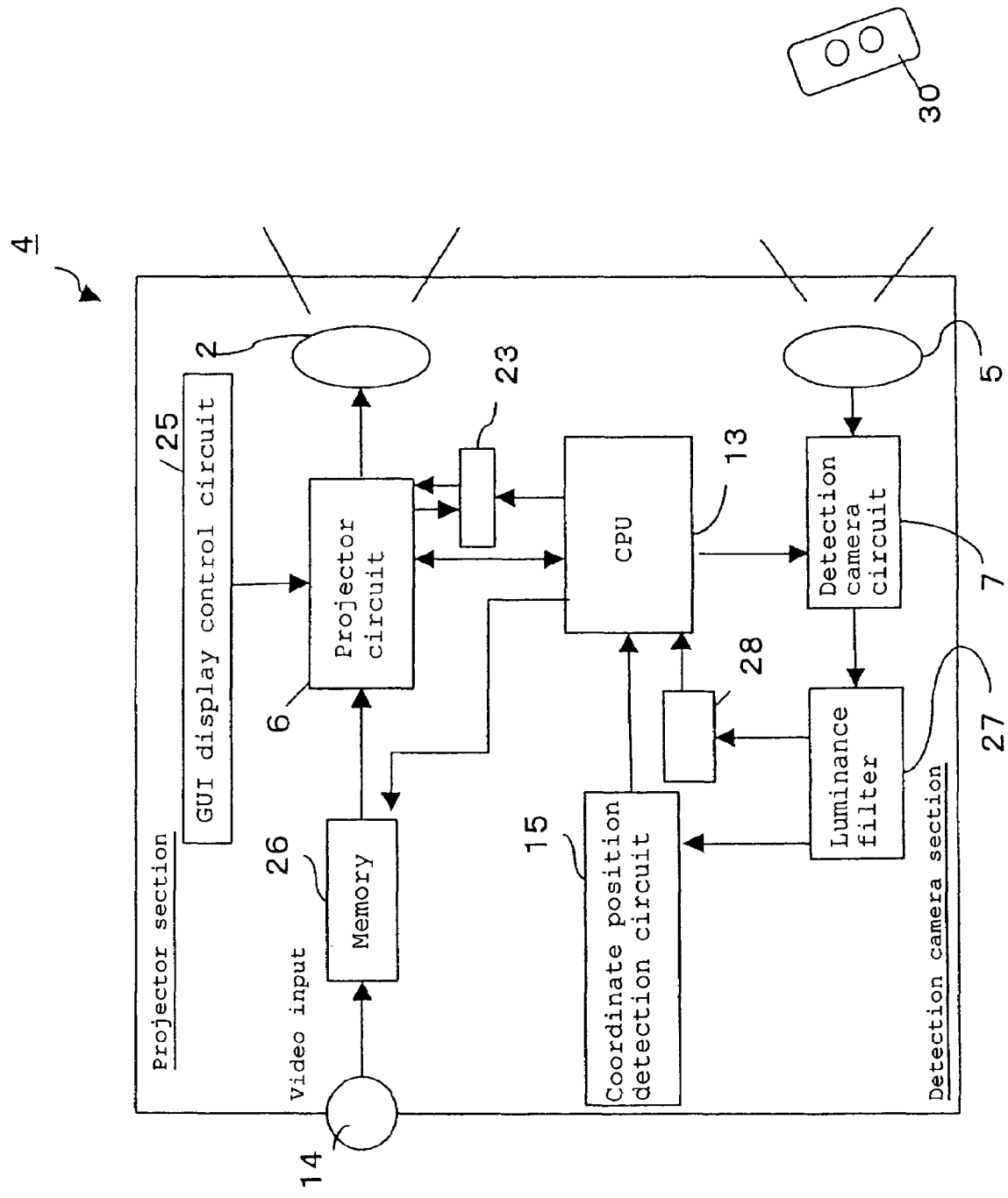
FIG. 9 is a block diagram showing an internal configuration of a projector system according to Embodiment 4 of the present invention.

FIG. 9 shows a block configuration of a projector system according to Embodiment 4.

In the configuration of FIG. 9, like components to those of the projector system of Embodiment 3 are designated by like reference numerals, and hence their description is omitted. In the projector system of the present embodiment, a demodulation circuit 28 serving as an example of the demodulation section of the present invention is arranged between the luminance filter circuit 27 and the CPU 13. The demodulation circuit 28 demodulates a modulated luminance signal of a luminance point outputted from the luminance filter circuit 27.

Figure 10:
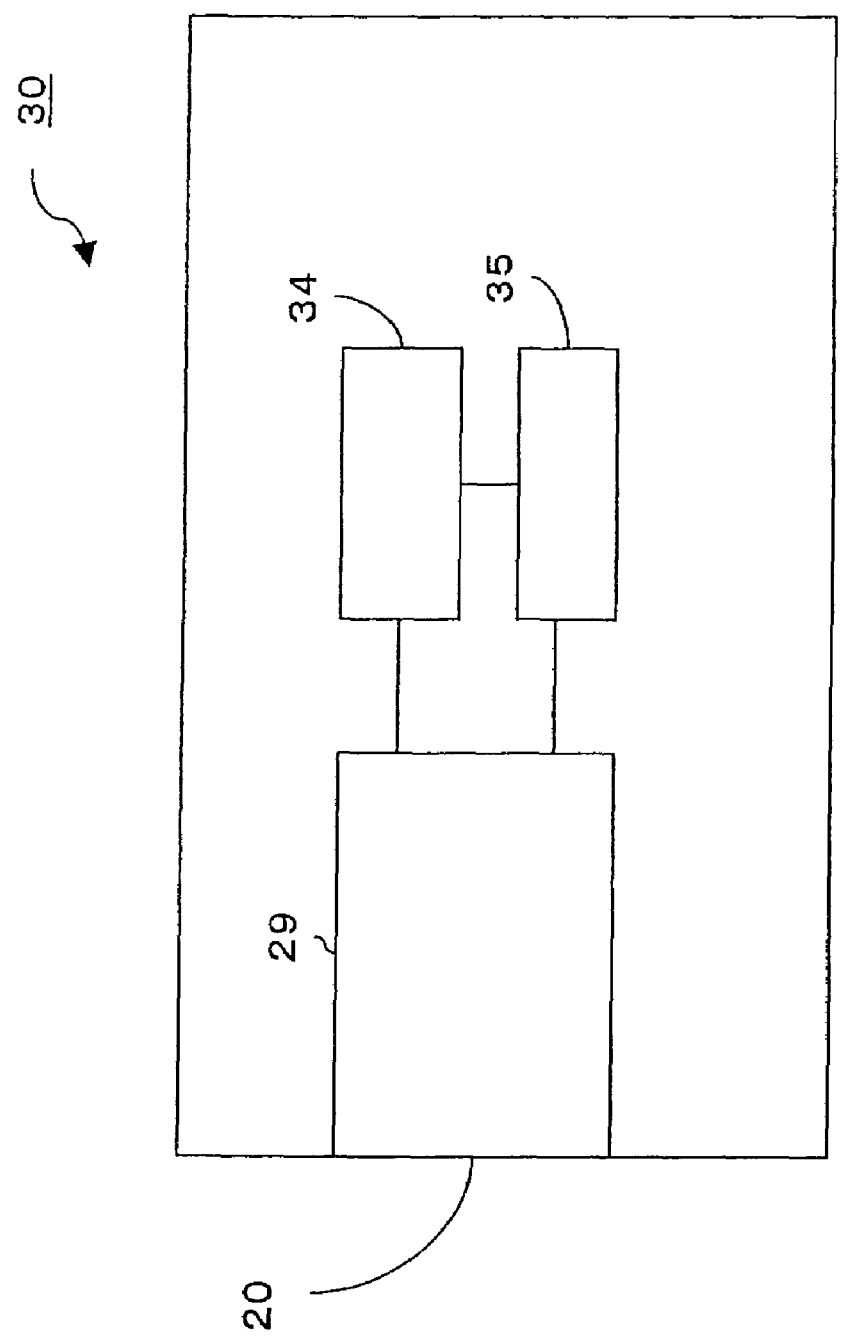
FIG. 10 is a block diagram showing an internal configuration of a laser pointer used in a projector system according to Embodiment 4 of the present invention.

FIG. 10 is a block diagram showing an internal configuration of a laser pointer 30 serving as another example of the pointing device of the present invention. In the laser pointer 30 shown in FIG. 10, a laser modulation circuit 34 is connected that modulates laser light generated by the laser irradiation section 29, and that serves as an example of the pulse modulation section of the present invention. Further, a control circuit 35 of controlling the laser irradiation section and the laser modulation circuit 34 is connected to the laser modulation section 34 and the laser irradiation section 29. The control circuit 35 has the function of performing a predetermined operation on the basis of a signal from the laser light emission push button 17, the zoom magnification factor change button 18, and the usage priority request button 19.

In the present embodiment, the CPU 13, the coordinate position detection circuit 15, and the demodulation circuit 28 correspond to an example of the pointed position detecting section in the projector system of the first aspect of the present invention.

Next, the operation of the projector system of the present embodiment is described below.

Similarly to Embodiment 3, a video signal inputted through the video input terminal 14 is accumulated in the memory 26. Then, an image corresponding to the GUI display area 24 is added to the signal. After that, the signal is projected onto the screen 1.

On the other hand, the image projected onto the screen 1 is inputted to the detection camera circuit 7 via the detection lens 5. At that time, an audience person operates the laser pointer 30 and thereby moves the luminance point generated by the laser light projected from the laser pointer 30, to a desired position of the image. When the location to which he desires to move it is confirmed, the audience person pushes the laser light emission push button 17 into a full push state. At that time, the control circuit 35 of the laser pointer 30 generates a trigger signal. The generated trigger signal is outputted to the laser modulation circuit 34.

The trigger signal outputted to the laser modulation circuit 34 is pulse-modulated and then inputted to the laser irradiation section 29. The laser irradiation section 29 projects the pulse-modulated trigger signal as laser light from the laser irradiation section 29.

On the other hand, in the projector unit 4, the image projected onto the screen 1 is inputted to the detection camera circuit 7 via the detection lens 5. At that time, when a pulse-modulated luminance point is displayed on the screen 1, a luminance signal outputted from the luminance filter circuit 27 is inputted to the demodulation circuit 28. The inputted luminance signal is demodulated by the demodulation circuit 28, so that the trigger signal generated in the laser pointer 30 is extracted. The extracted trigger signal is outputted to the CPU 13. When the trigger signal is inputted from the demodulation circuit 28, the CPU 13 causes the coordinate position detection circuit 15 to detect the coordinates of the luminance point outputted from the luminance filter circuit 27. When the coordinate position detection circuit 15 detects the coordinates of the luminance point, the CPU 13 specifies an image corresponding to the coordinates of the luminance point at the time that the trigger signal is inputted. Then, the CPU 13 displays the image corresponding to the GUI display area 24 by an operation similar to that of Embodiment 3.

In this case, from the laser pointer 30, a zoom signal may also be modulated in the laser modulation circuit 34 together with the trigger signal. Then, in the demodulation circuit 28, the zoom signal may be demodulated similarly to the trigger signal, and may then be inputted to the CPU 13. In this case, an image expanded by a desired magnification factor specified in the zoom magnification factor change button 18 can be displayed on the screen 1.

Embodiment 5

Figure 11:
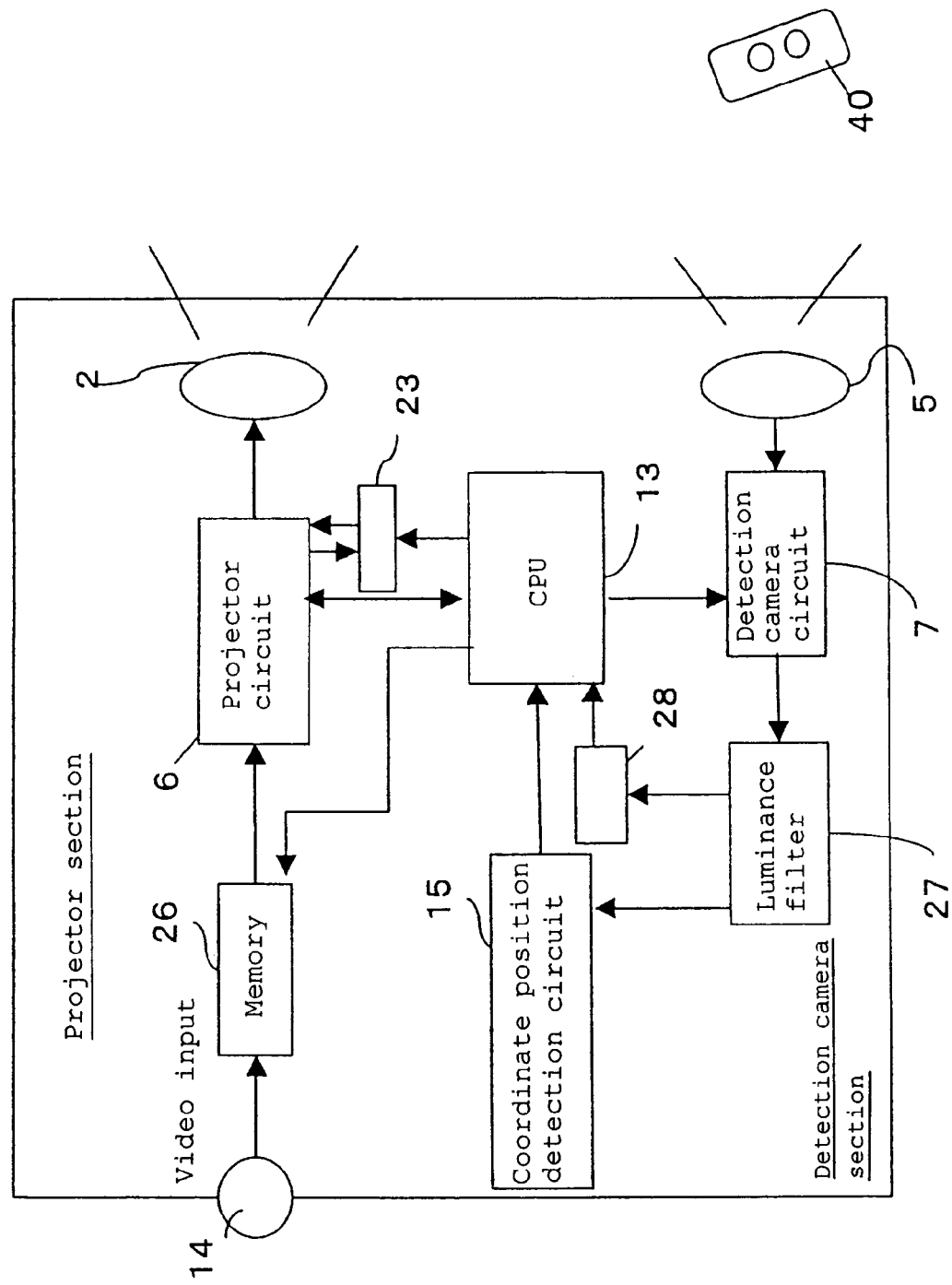
FIG. 11 is a block diagram showing an internal configuration of a projector system according to Embodiment 5 of the present invention.

FIG. 11 shows a block configuration of a projector system according to Embodiment 5.

In the block configuration of FIG. 11, like components to those of the projector system of Embodiment 4 are designated by like reference numerals, and hence their description is omitted. The difference in the configuration of the projector system shown in FIG. 11 from that of Embodiment 4 is the absence of the GUI display control circuit 25.

Figure 12:
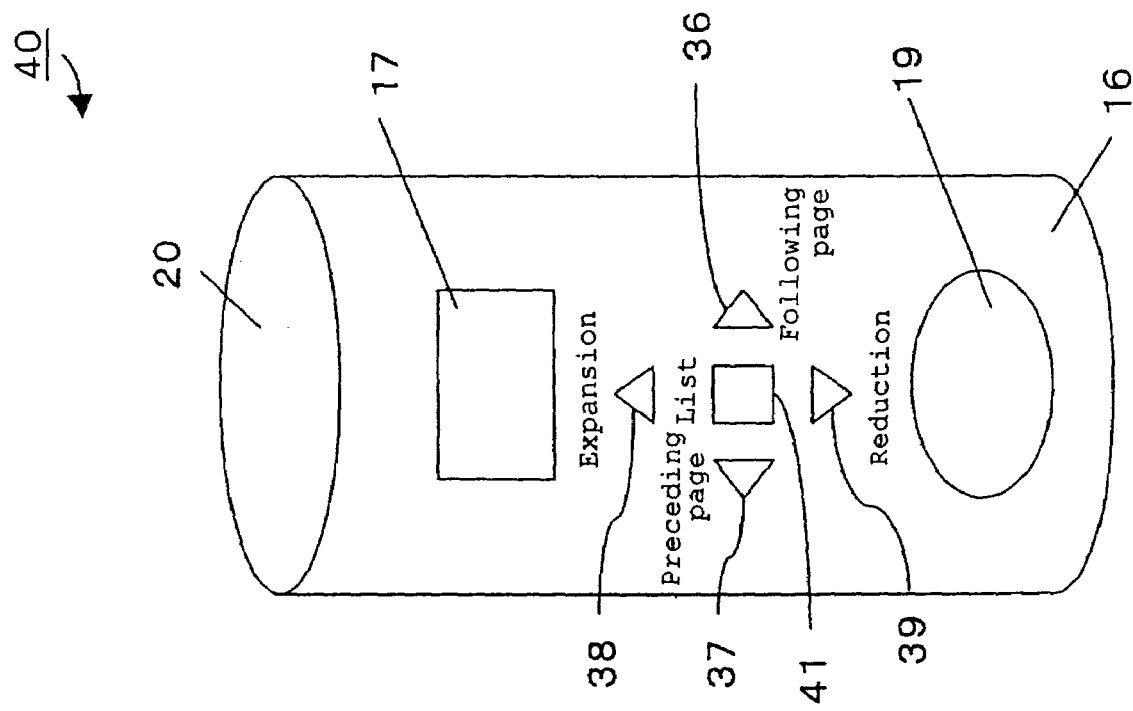
FIG. 12 is a perspective view showing a general appearance of a laser pointer used in a projector system according to Embodiment 5 of the present invention.

FIG. 12 is a perspective view showing a laser pointer 40 that is used in the projector system of the present embodiment and that serves as yet another example of the pointing device of the present invention. In the laser pointer 40 shown in FIG. 12, a main body 16 comprises an image expansion button 38, an image reduction button 39, a forward page feed button 36, a backward page feed button 37, and a list display button 41. Then, a control circuit 35 is connected to these buttons, and has the function of performing a predetermined operation. That is, when the image expansion button 38, the image reduction button 39, the forward page feed button 36, or the backward page feed button 37 is operated, a corresponding signal is generated regarding the control circuit 35, and then pulse-modulated in the laser modulation circuit 34. The signal pulse-modulated as described above is projected as laser light from the laser projection section 29 to the screen 1.

The operation of the projector unit 4 in the case that the image expansion button 38 or the image reduction button 39 is operated is similar to that of Embodiment 4. However, in the case that the forward page feed button 36, the backward page feed button 37, or the list display button 41 is operated in the laser pointer 40, the coordinates of the luminance point displayed on the screen 1 are not taken into consideration.

For example, in the CPU 13 of the projector unit 4, when a backward page feed signal is recognized, no signal is inputted from the coordinate position detection circuit 15, or alternatively, even when a signal is inputted from the coordinate position detection circuit 15, the signal is ignored in the CPU 13. Then, on the basis of the backward page feed signal and the image projected by the projector circuit 6 at the time, the CPU 13 causes the projector circuit 6 to project an image corresponding to the backward page feed signal, from among the image information accumulated in the memory 26.

As described above, according to the projector system of the present embodiment, the GUI display area 24 need not be displayed, while the audience person need not move and fix the laser light to the GUI display area 24. This allows the audience person to operate the projected image by a simpler operation.

In the use of the projector system of the embodiments described above, when a plurality of audience persons use the laser pointers 3 and address a question the presenter, the situation that each audience person possesses and operates a laser pointer 3 arbitrarily could cause confusion in the display on the screen 1. In order to avoid such confusion, usage priority may be assigned to the laser pointers 3 by the operation shown in FIGS. 13 and 14.

Figure 13:
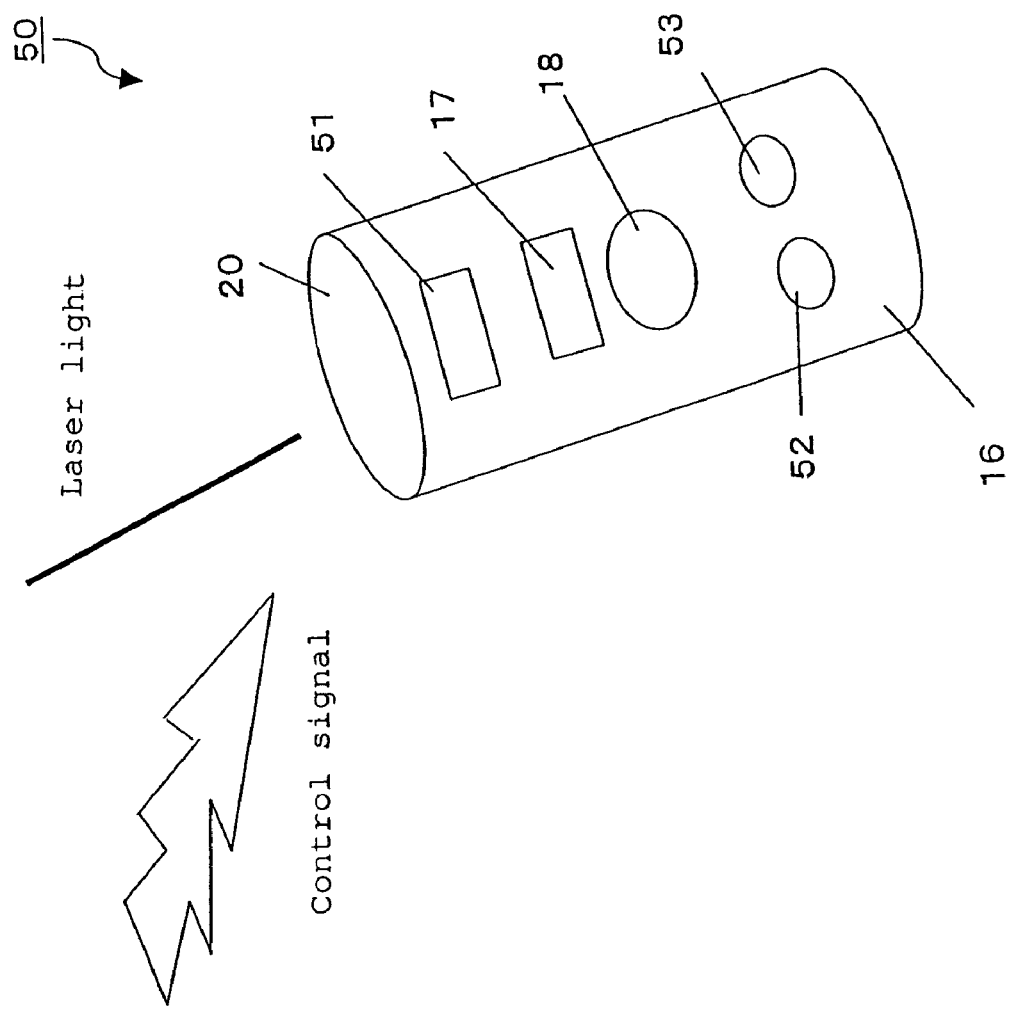
FIG. 13 is a perspective view showing a general appearance of another example of a laser pointer used in a projector system according to Embodiments 1-5 of the present invention.

FIG. 13 is a perspective view showing a laser pointer 50 serving as a main unit operated by a presenter. The laser pointer 50 has a display 51, a usage priority approval button 52, and a usage priority cancellation button 53.

Figure 14:
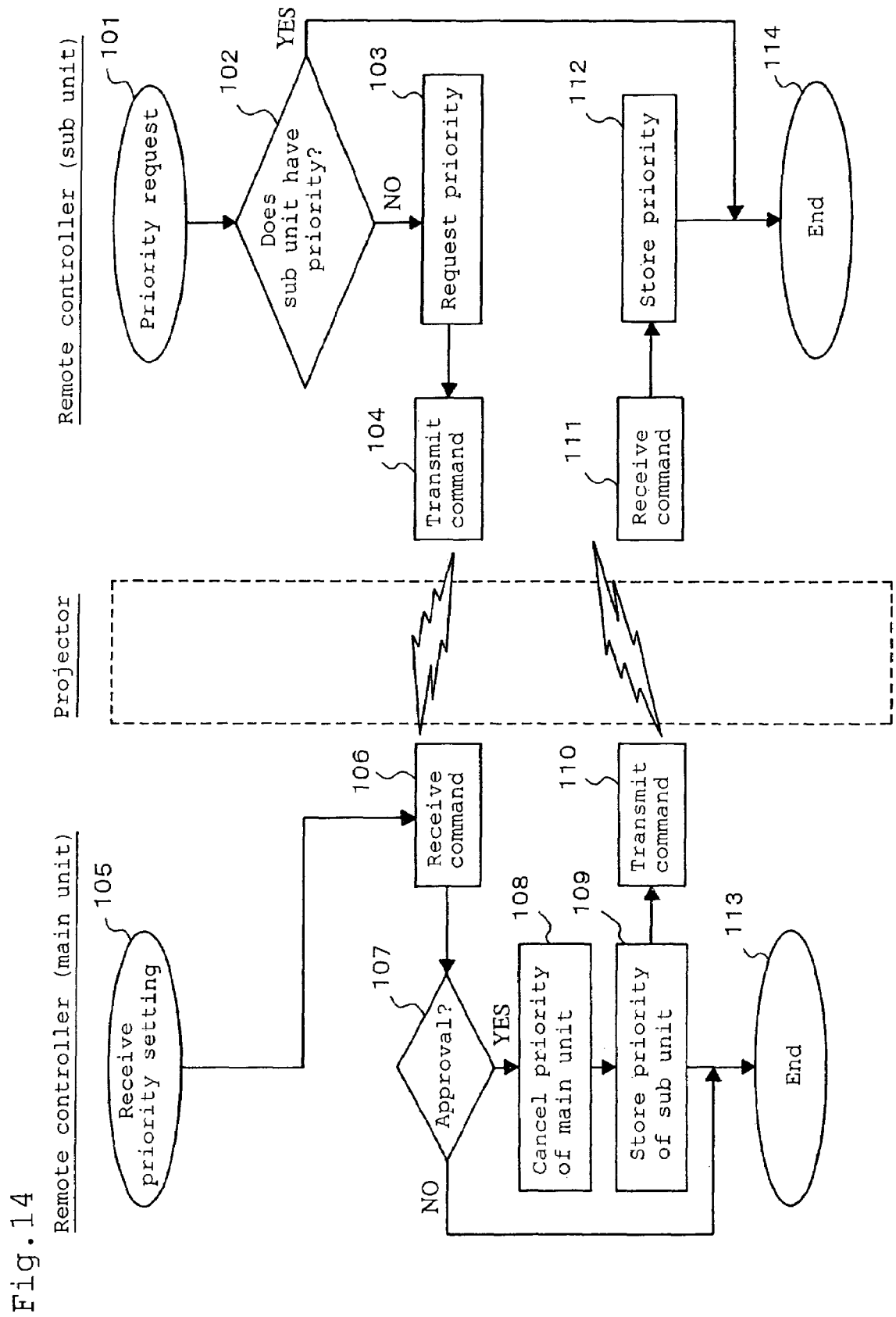
FIG. 14 is a flow chart describing the switching of usage priority of a pointing device in the use of a projector system according to Embodiments 1-5 of the present invention.

FIG. 14 is a diagram showing the flow of transfer of usage priority from a main unit to a sub unit, in the case that the laser pointer 50 operated by a presenter serves as the main unit, and that a laser pointer 3 operated by an audience person serves as the sub unit.

First, when the usage priority request button 19 of the sub unit is pushed, the control circuit 33 generates a usage priority request (step 101). Then, the control circuit 33 determines whether the sub unit has usage priority (step 102). When the sub unit has usage priority, the operation is terminated (step 114). When the control circuit 33 determines that the sub unit does not have usage priority, a usage priority request signal is generated (step 103). The generated usage priority request signal is transmitted via the transmission and reception circuit 31 and the antenna 32 (step 104).

The transmitted usage priority request signal is received by the antenna 21 of the projector unit 4, then goes through the transmission and reception circuit 22, and then is transmitted from the antenna 21 to the main unit. When the usage priority request signal is received by the antenna 32 of the main unit (step 105), the received usage priority request signal is transmitted to the control circuit 33 via the transmission and reception circuit 31 (step 106). Then, the display 51 of the main unit displays the ID of the sub unit having transmitted the usage priority request signal and the message that a usage priority request has been transmitted. The control circuit 33 of the main unit determines whether the usage priority request signal transmitted from the sub unit is to be approved (step 107).

That is, with checking the contents displayed on the display 51, when the presenter approves the usage priority request from the sub unit, the presenter pushes the usage priority approval button 52 of the main unit. Then, the control circuit 33 of the main unit cancels the main unit's own usage priority (step 108), and then stores the usage priority of the subunit (step 109). Then, a usage priority approval signal for the sub unit is generated in the control circuit 33, and then transmitted to the sub unit via the transmission and reception circuit 31 and antenna 32 of the main unit and the antenna 21 and the transmission and reception circuit 22 of the projector unit 4 (step 110). The antenna 32 and the transmission and reception circuit 31 of the subunit receive the usage priority approval signal transmitted from the main unit (step 111). The control circuit 33 of the sub unit stores the presence of usage priority (step 112), and then performs processing (step 114). The display 51 of the main unit displays that a specific sub unit has usage priority. Further, in the sub unit, a lamp (not shown) or the like indicates that the sub unit itself has usage priority.

When the presenter does not approve the usage priority request from the sub unit, the presenter does not push the usage priority approval button 52. In this case, the usage priority approval request from the sub unit is ignored. Then, the processing in the main unit is terminated (step 113).

Figure 15:
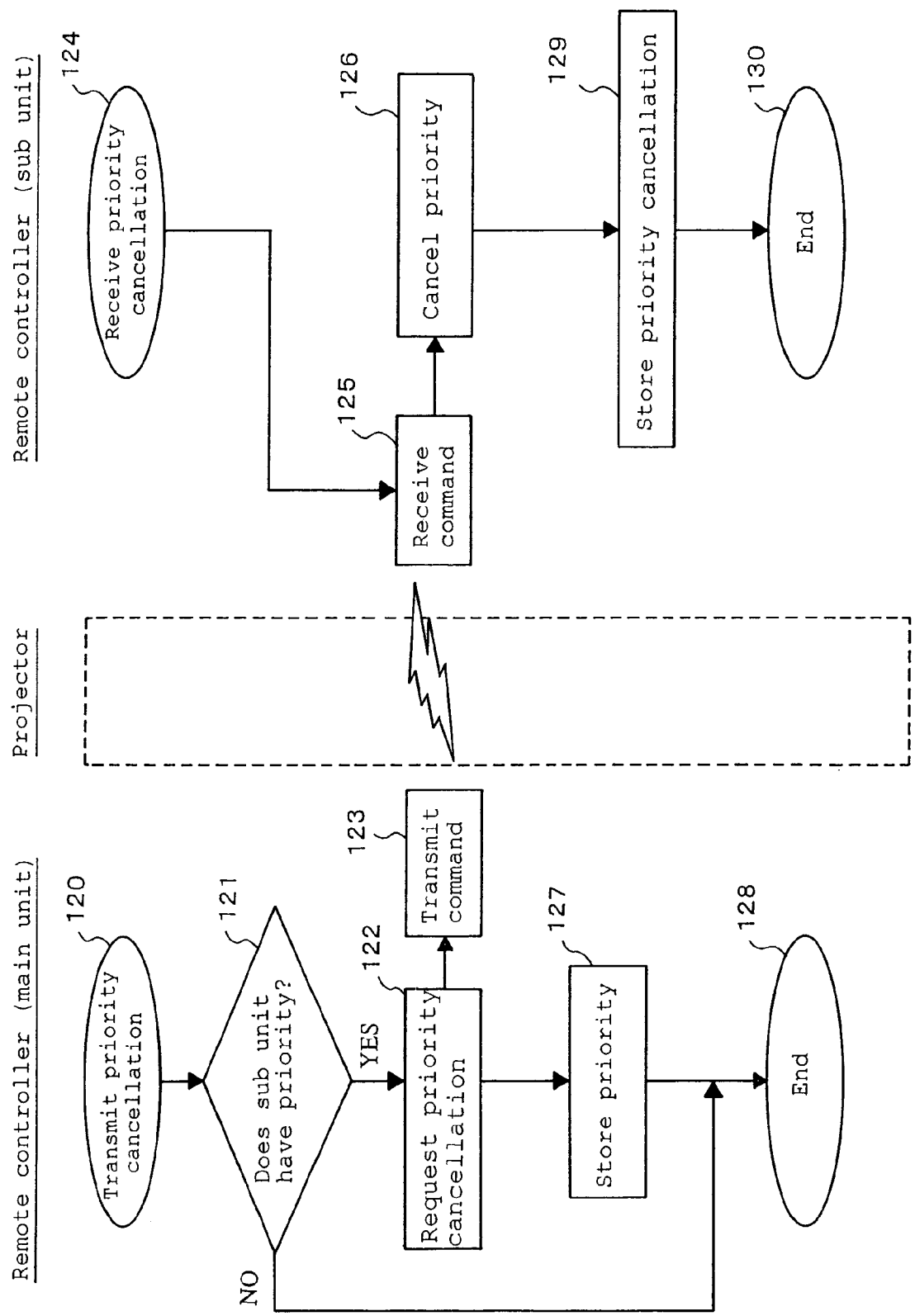
FIG. 15 is a flow chart describing the switching of usage priority of a pointing device in the use of a projector system according to Embodiments 1-5 of the present invention.

FIG. 15 is a diagram showing the flow that the main unit cancels the usage priority of a sub unit.

With watching the display 51 of the main unit, when the presenter desires to cancel the usage priority of a sub unit, the presenter pushes the usage priority cancellation button 53 of the main unit (step 120). When the usage priority cancellation button 53 is pushed, the control circuit 33 of the main unit checks whether a sub unit has usage priority (step 121). When no sub unit has usage priority, the processing is terminated (step 128). When it is confirmed that usage priority is present in the specific sub unit or any one of the sub units, the control circuit 33 of the main unit generates a priority cancellation request signal (step 122). The generated usage priority cancellation request signal is transmitted to the sub unit similarly to the case of FIG. 14 (step 123). When the usage priority cancellation signal is received by the sub unit (step 124), the usage priority cancellation signal is transmitted to the control circuit 33 (step 125). The control circuit 33 of the sub unit cancels the usage priority set up in the sub unit (step 126), and then stores the state that usage priority is canceled (step 129). Then, the processing is terminated (step 130).

In the description of FIG. 15, the display 51 may display the IDs of a plurality of subunits where cancellation is to be performed. Then, the presenter may cancel a specific sub unit selected from the plurality, or alternatively may cancel the usage priority of a plurality of the sub units simultaneously.

In the description given above with reference to FIGS. 13-15, the display 51 of the main unit may be a lamp or the like. In this case, it may be indicated which sub unit has usage priority. Alternatively, regardless of a specific subunit, the situation may be displayed that usage priority is present in any one of the sub units.

The configuration of the usage priority approval button 52 and the usage priority cancellation button 53 is not limited to that shown in FIG. 13. For example, the main unit may have a configuration similar to that of the sub unit shown in FIG. 3. Then, the configuration may be such that in the case that usage priority is present in the main unit, when the usage priority request button 19 of the main unit is operated or not operated, usage priority of the sub unit may be approved. Further, the configuration may be such that in the case that usage priority is present in the sub unit, when the usage priority request button 19 of the main unit is pushed, the usage priority of the sub unit is canceled according to an operation similar to that described above.

Further, the transmission and reception of the signal between the main unit and the sub unit have been performed via the projector unit 4. However, the transmission and reception may directly be performed between the main unit and the sub unit.

Further, in the description of Embodiments 1-5 given above, the laser pointer 50 used by the presenter has served as a main unit, while the laser pointer 3 used by an audience person has served as a subunit. However, a specific person among the audience persons may operate the main unit. Alternatively, the chairperson may possess the main unit.

Further, in the description of Embodiments 1-5 given above, in the image displayed on the screen 1, its lower left corner has been recognized as the reference coordinate point. However, coordinates recognition may be performed with reference to another position.

Further, in the description of Embodiments 1-5 given above, the reference point of coordinates need not necessarily be determined at each time that an image is displayed on the screen 1. Except for the case that the image is to be expanded, the reference point of coordinates may be recognized solely when an image is displayed at the first time.

Further, in the description of Embodiments 4 and 5, the laser light projected from the laser pointer 30 or 40 has been pulse-modulated. However, another modulation method may be employed. For example, the wavelength may be modulated depending on a signal operated in the laser pointer 30 or 40. In this case, as long as the demodulation circuit 28 has the function of demodulating the wavelength-modulated signal, effects similar to those described above are obtained. Further, in place of the modulation depending on the operation signal, the laser pointer 30 or 40 may have a plurality of laser irradiation sections 29, so that laser light of a distinct wavelength may be projected from each laser irradiation section 29.

Further, in the description of Embodiments 1-5 given above, the image correction section of the present invention has been implemented by the image magnifying circuit 23 or the GUI control circuit. However, a circuit having another configuration may be employed as long as the circuit serves as means of capable of correcting image information on the basis of the position specified by the pointing device of the present invention. Even in this case, effects similar to those described above are obtained.

Further, in the description of Embodiments 1-5 given above, an audience person has operated the laser pointer 3, 30, or 40. However, obviously, the presenter may operate the laser pointer.

Further, in the description of Embodiments 1-5 given above, the pointing device of the present invention has been implemented by the laser pointer 3, 30, or 40. However, the invention is not limited to means of projecting laser light. Another kind of means capable of generating a luminance point that is superposed on the image projected onto the screen 1 and that is brighter than the surrounding image portion may be employed.

Further, in the description of Embodiments 1-5 given above, the image pick-up section of the present invention has been implemented, for example, by the detection lens 5, the detection camera circuit 7, the A/D converter 8, and the frame memory 9. However, the image pick-up section may be implemented by another configuration.

Further, in the description of Embodiments 1-5 given above, in place of the use of the image pick-up section of picking up an image projected onto the screen 1, a recognition section of capable of recognizing an image projected onto a projection target and pointed by a pointing device of the present invention may be employed. For example, a member of sensing light or the like may be applied or arranged on the projection target, so that the above-mentioned image may be detected by light or the like detected in a position specified by a pointing device.

Further, in the description of Embodiments 1-5 given above, the projection target of the present invention has been implemented by the screen 1. However, the projection target of the present invention may be an object other than the screen 1. For example, projection may be performed onto a wall surface. Even in this case, when an image can be projected, and when a pointing device can point a position visually, effects similar to those described above are obtained.

Further, in the description of Embodiments 1-5 given above, the first projection section of the present invention and the pointed position detecting section, the image pick-up section, and the recognition section in the projector system of the first aspect of the present invention are not limited to the configuration described above, and may be implemented by another configuration having a similar function.

Embodiment 6

Figure 16:
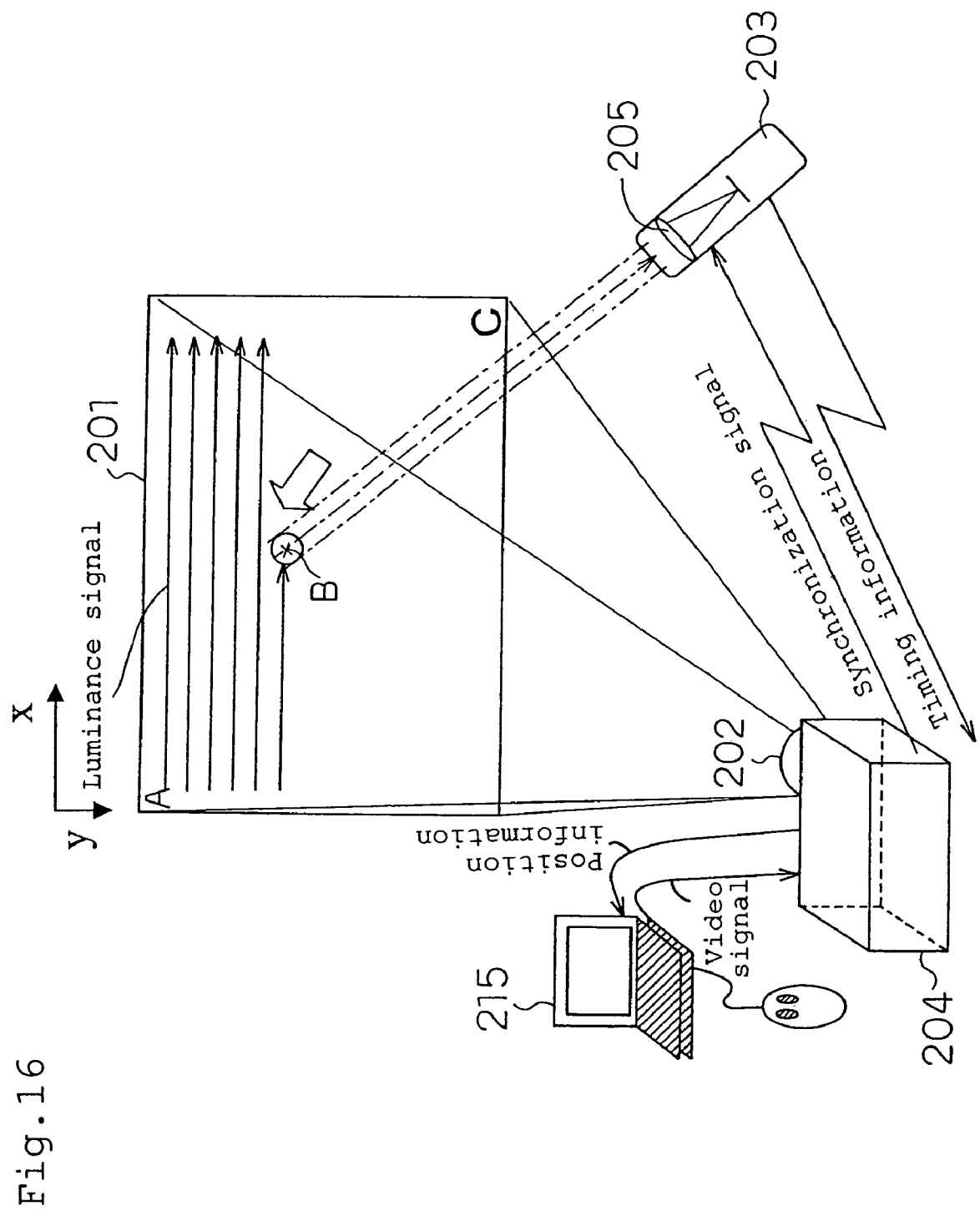
FIG. 16 is a diagram showing a schematic configuration of a projector system according to an embodiment of the present invention.

FIG. 16 shows a schematic configuration of a projector system according to an embodiment of the present invention.

In the projector system shown in FIG. 16, a projector unit 204 is provided with a projection lens 202. The projector unit 204 is connected to a personal computer 215. A screen 201 serving as an example of the projection target of the present invention is arranged in a manner opposing to the projection lens 202. A hand-held device 203 serving as an example of the pointing section of the present invention is arranged toward the screen 201.

Figure 17:
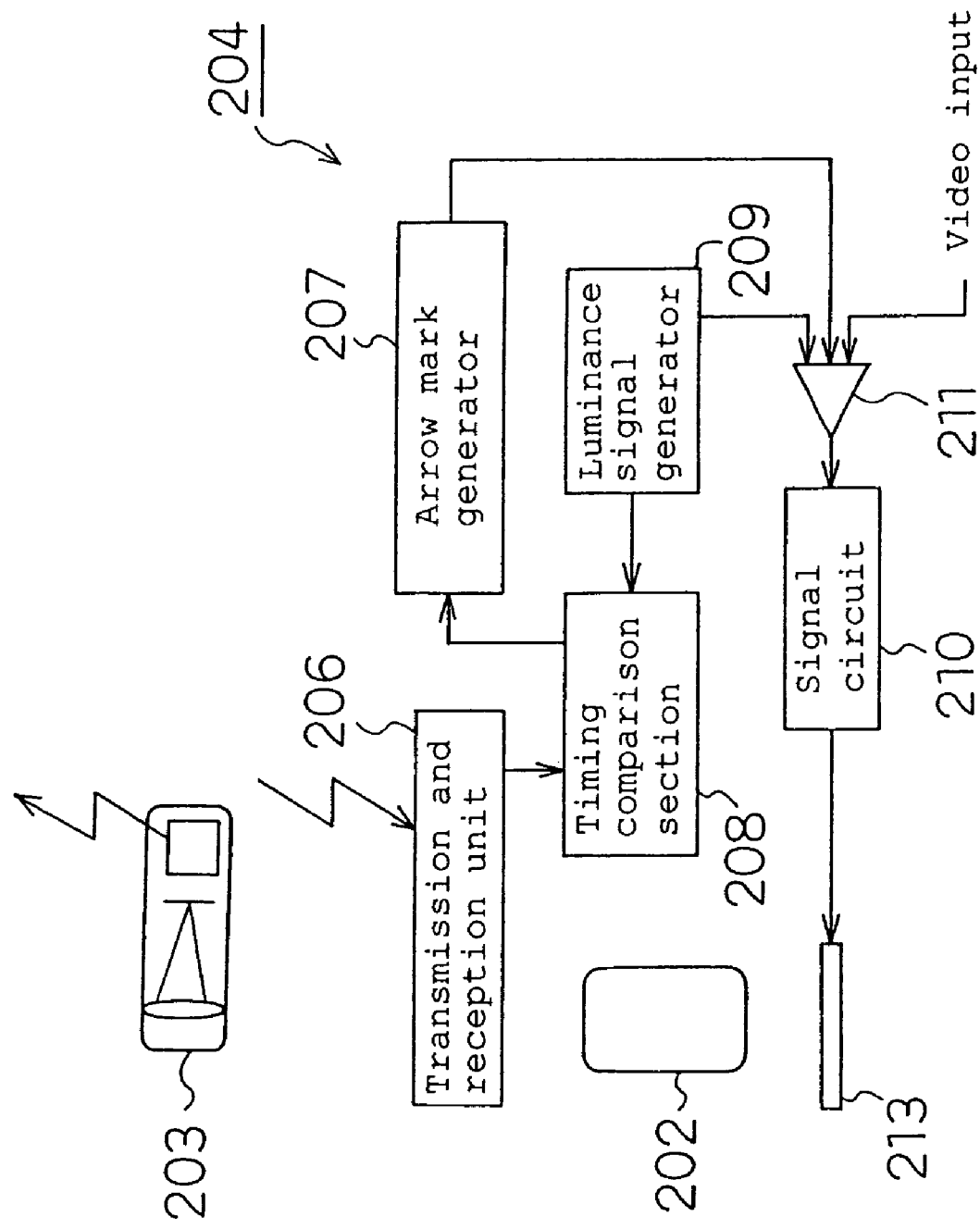
FIG. 17 is a block diagram showing an internal configuration of a projector unit in a projector system according to an embodiment of the present invention.

FIG. 17 is a block diagram showing an internal configuration of the projector unit 204.

In the projector unit 204 shown in FIG. 17, numeral 206 indicates a transmission and reception unit of transmitting and receiving a signal to and from the hand-held device 203. Numeral 209 is a luminance signal generator serving as an example of the scanning signal generating section of the present invention. Numeral 208 is a timing comparison section that compares the timing between a luminance signal generated by the luminance signal generator 209 and a signal received from the hand-held device 203 by the transmission and reception unit 206, and that serves as an example of the pointed position detecting section in the projector system of the 17th or 26th aspect of the present invention. Numeral 207 indicates an arrow mark generator in which on the basis of a signal outputted as a result of timing comparison in the timing comparison section 208, an arrow mark signal is generated that serves as an example of the identification information of the present invention. Numeral 211 is a superposition circuit of superposing the luminance signal generated by the luminance signal generator 209, the arrow mark signal generated by the arrow mark generator 207, and a video signal inputted from the personal computer 215. Numeral 210 indicates a projector circuit of converting into an optical signal the superposed signal provided from the personal computer 215, and includes a liquid crystal element (not shown). Numeral 213 indicates a light valve of projecting an optical signal provided from the signal circuit 210. The projection lens 202 projects the optical signal provided from the signal circuit 210 and the light valve 213 onto the screen 201. Here, an example of the first projection section of the present invention corresponds to the projection lens 202, the signal circuit 210, and the light valve 213. The timing comparison section 208 has coordinate information of the screen 201, in the inside.

Figure 18:
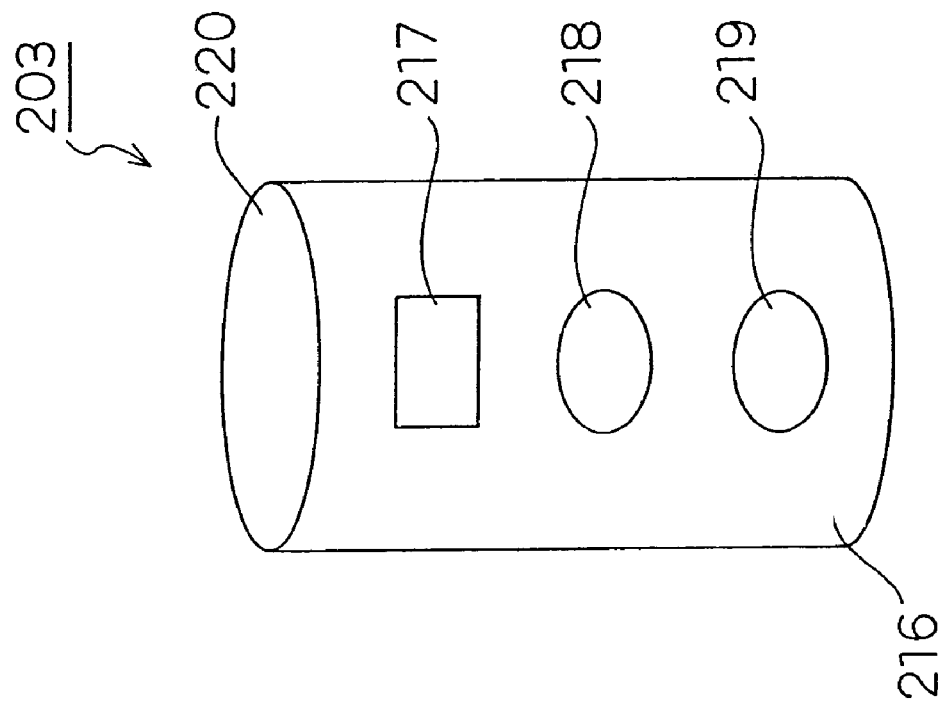
FIG. 18 is a perspective view showing an example of a hand-held device used in a projector system according to an embodiment of the present invention.

FIG. 18 is a perspective view showing a general appearance of the hand-held device 203 serving as an example of the pointing section of the present invention. In the hand-held device 203, a main body 216 comprises a position confirmation push button 217, a zoom magnification factor change button 218, and a usage priority request button 219. Numeral 220 indicates a detection surface directed to a predetermined position of the screen 201 to detect an image.

Figure 19:
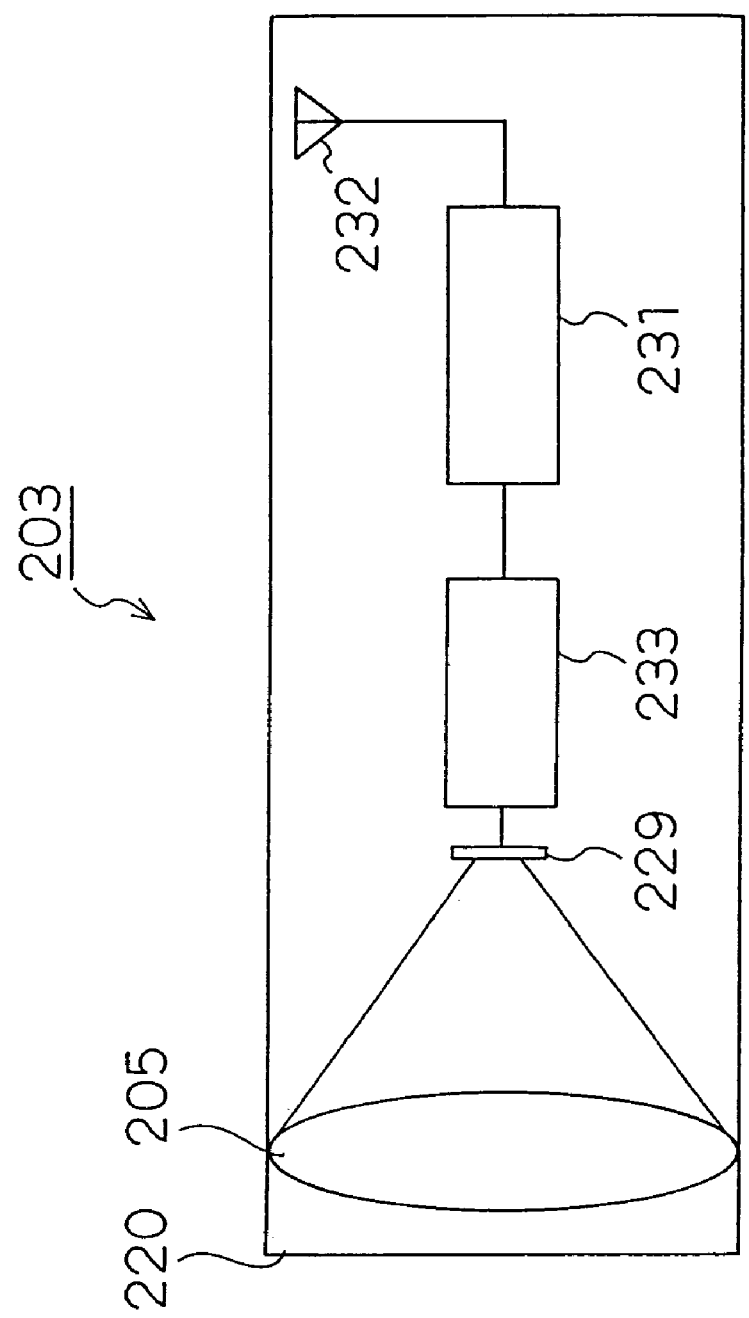
FIG. 19 is a block diagram showing an internal configuration of a hand-held device used in a projector system according to an embodiment of the present invention.

FIG. 19 is a block diagram showing an internal configuration of the hand-held device 203. As shown in FIG. 19, the hand-held device 203 comprises a detection lens 205, a CCD 229, a transmission and reception circuit 231, an antenna 232, and a control circuit 233, in the inside. The detection lens 205 is arranged in the detection surface 220. The CCD 229 serves as an example of the light-receiving element of the present invention, and converts into an electric signal the image detected by the detection lens 205. The control circuit 233 is a circuit of generating a timing signal on the basis of an image signal transmitted from the CCD 229, and thereby controlling the entirety of the hand-held device 203. The transmission and reception circuit 231 is a circuit that transmits and receives a signal to and from the projector unit 204 via the antenna 232, and that corresponds to the transmission section and the reception section of the present invention.

Next, the operation of the projector system according to the present embodiment having the above-mentioned configuration is described below.

A video signal selected in the personal computer 215 is inputted to the superposing section 211 of the projector unit 204. The luminance signal generator 209 generates a luminance signal of scanning the entire screen 201 in approximately 1/30 second. The luminance signal generator 209 generates also a signal that synchronizes with the generated luminance signal (referred to as a synchronization signal, hereafter). This synchronization signal is transmitted to the hand-held device 203 via the timing comparison section 208 and the transmission and reception unit 206.

The luminance signal generated in the luminance signal generator 209 has a luminance permitting distinction from the surroundings when the signal is superposed with the video signal and then projected (described later). For example, a part where a part having the maximum luminance in the video signal is superposed with the luminance signal corresponds to the maximum luminance of the liquid crystal element provided in the signal circuit 210. That is, the luminance of the video signal is adjusted such that the maximum luminance of the video signal should not reach the maximum luminance of the liquid crystal element. Then, the adjustment is further performed such that the maximum luminance of the liquid crystal display element should be reached when the maximum luminance of the video signal and the luminance signal are superposed. Further, in an area onto which an image having a luminance higher than a predetermined value is projected, a luminance signal having a luminance lower than a certain value may be generated. On the contrary, in an area onto which an image having a luminance lower than a predetermined value is projected, a luminance signal having a luminance higher than a certain value may be generated The generated luminance signal is inputted to the superposing section 211. The video signal and the luminance signal inputted to the superposing section 211 are superposed, and then inputted to the signal circuit 210. The signal superposed and inputted to the signal circuit 210 is displayed on the liquid crystal element (not shown). The displayed signal is irradiated by the light valve 213, and thereby projected onto the screen 201 via the projection lens 202.

As such, the superposed signal is projected onto the screen 201 so that the video information selected in the personal computer 215 is displayed on the screen 201. At that time, the luminance signal scans, for example, from the upper left to the lower right of the screen 201 in approximately 1/30 second. Thus, the signal cannot be recognized visually. However, when a small area on the screen 201 is inspected, the signal can be observed as a luminance point blinking at a predetermined scan time interval (approximately 1/30 second in this case). At that time, the width that the luminance signal scans horizontally is set to be equal to the horizontal width of the screen 201, while the width that the luminance signal scans vertically is set to be equal to the vertical width of the screen 201.

The detection surface 220 of the hand-held device 203 is directed to a part of the image on the screen 201 in this state. The start point of the scanning signal on the screen 201 is set at point A at the upper left of the image, while a line extending from the center of the detection surface 220 of the hand-held device 203 hits point B on the screen 201. Then, the synchronization signal generated in the luminance signal generator 209 is synchronized with the timing that the luminance signal reaches point A in the image.

The detection lens 205 of the hand-held device 203 projects onto the CCD 229 a part (the area surrounded by a circle in FIG. 16) of the image to which the hand-held device 203 is directed, within the image projected on the screen 201. At that time, adjustment is performed such that the center of the image projected onto the CCD 229 should correspond to point B. The image projected onto the CCD 229 is converted into an electric signal, and then transmitted to the control circuit 233.

On the other hand, the synchronization signal generated in the luminance signal generator 209 is transmitted to the control circuit 233 via the antenna 232 and the transmission and reception circuit 231. With reference to the transmitted synchronization signal, the control circuit 233 calculates a time which the luminance of point B takes to change. This time calculation gives the time that the luminance signal moves from point A to point B on the screen 201. The control circuit 233 transmits the calculated time as timing information to the projector unit 204 via the transmission and reception circuit 231 and the antenna 232.

The timing information transmitted from the hand-held device 203 is received by the transmission and reception unit 206 of the projector unit 204, and then transmitted to the timing comparison section 208. The timing comparison section 208 compares the received timing information with the coordinate information of the screen 201, and thereby calculates as position information the point where the timing information agrees with the coordinate information of the screen 201. For example, when the coordinate information of the screen 201 is x and y coordinates, these x and y coordinates are converted into a time coordinate with reference to point A. That is, by assigning in-between points proportionally where point A is set to be 0, while point C which is opposing to point A and located at the lower right of the screen 201 is set to be the time end position of one scan, each of x and y coordinates is thereby expressed in the time coordinate. As such, the received timing information is compared with the coordinate information of the screen 201, so that the position information is calculated that specifies the position pointed by the hand-held device 203 on the screen 201.

The arrow mark generator 207 generates a signal (referred to as an arrow mark display signal, hereafter) of displaying an arrow mark on the coordinates corresponding to the calculated position information. The generated arrow mark display signal is transmitted to the superposing section 211, and then superposed with the video signal inputted from the personal computer 215 and the luminance signal generated by the luminance signal generator 209. Then, the signal is projected onto the screen 201 via the signal circuit 210 and the projection lens 202. Thus, by virtue of the operation described above, when an operator directs the hand-held device 203 toward a desired position of the screen 201, the arrow mark is displayed at the position.

As described above, according to the projector system of the present embodiment, when a desired position of the image on the screen 201 is pointed by the hand-held device 203, the position of the image projected on the screen 201 intended by the operator is specified by a simple operation somewhat like a tablet operation.

In the description of Embodiment 6, the position information calculated in the timing comparison section 208 has been inputted directly to the arrow mark generator 207. However, the information may be averaged over time and then inputted to the arrow mark generator 207. In this case, as shown in FIG. 20, an averaging circuit 240 is inserted between the timing comparison section 208 and the arrow mark generator 207.

Figure 20:
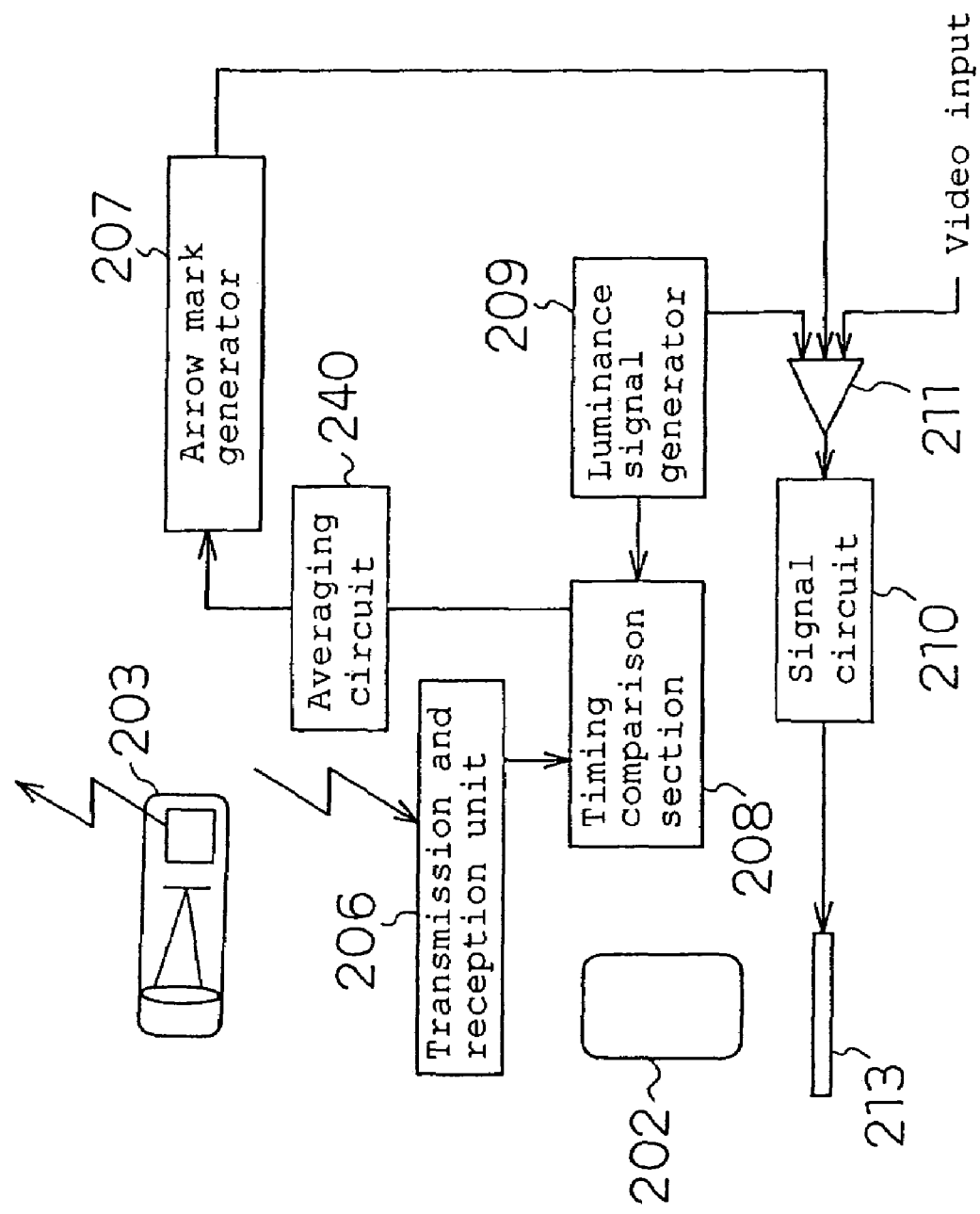
FIG. 20 is a block diagram showing an internal configuration of a projector unit in a projector system according to an embodiment of the present invention.

According to the projector system shown in FIG. 20, the position information calculated by the timing comparison section 208 is averaged over a predetermined time interval in the averaging circuit 240. The predetermined time interval is, for example, such a length that blurring caused by the person's hand can be corrected. As such, the position information is averaged in the predetermined time, so that the arrow mark displayed on the screen 201 is clearly seen without blurring.

Further, in the description of Embodiment 6, on the basis of the position information calculated by the timing comparison section 208, the arrow mark generator 207 has been generated the arrow mark. However, the arrow mark may be generated by the personal computer 215 connected. A configuration used in this case is shown in FIG. 21.

Figure 21:
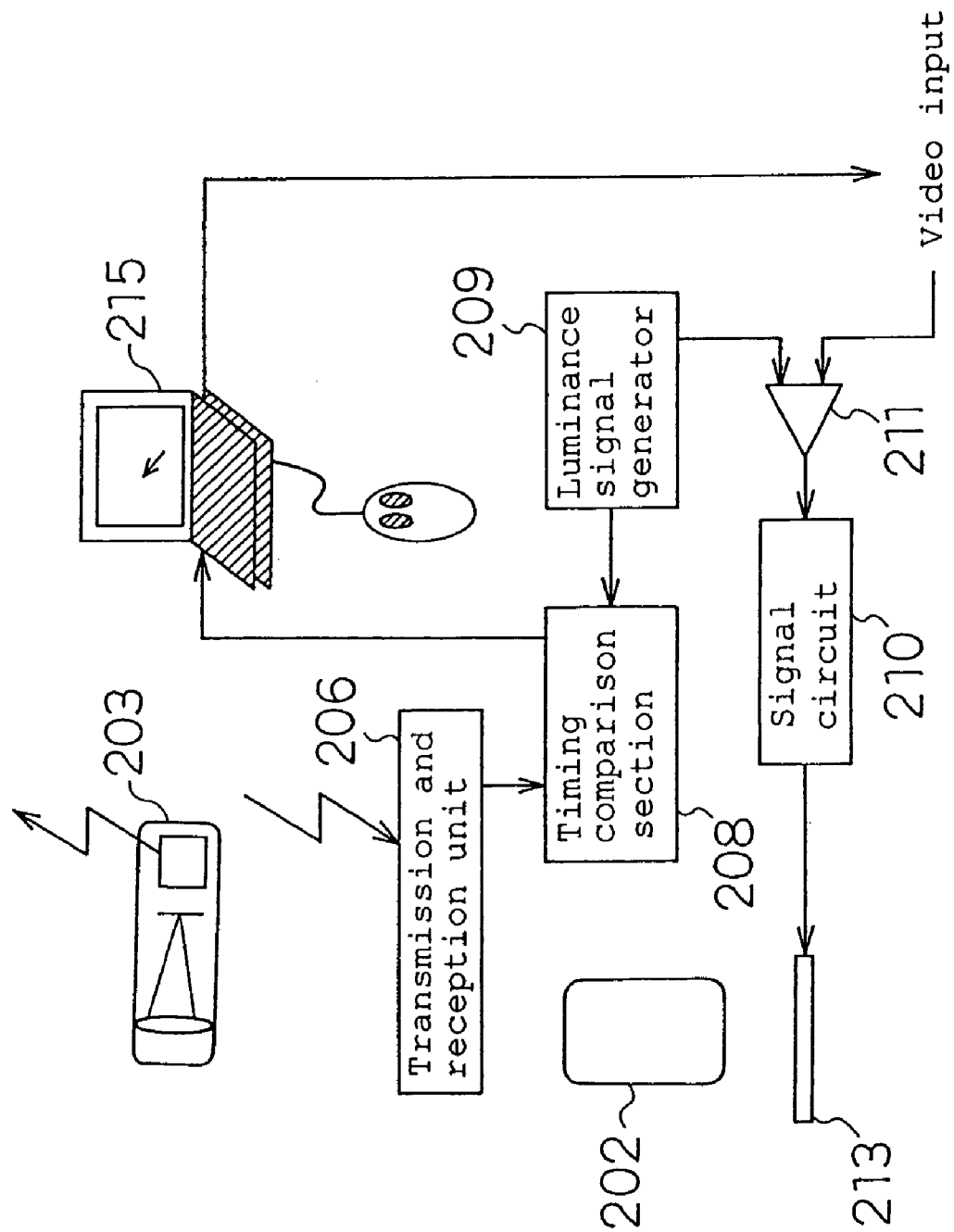
FIG. 21 is a block diagram showing an internal configuration of a projector unit in a projector system according to an embodiment of the present invention.

According to the configuration shown in FIG. 21, on the basis of the position information outputted from the timing comparison section 208, an arrow mark is generated in the personal computer 215. The generated arrow mark is combined in advance with the video signal to be projected. The video signal combined with the arrow mark is inputted as the image input to the superposing section 211. In the superposing section 211, this video signal is superposed with the luminance signal generated in the luminance signal generator 209, and then projected onto the screen 201. Even by this operation, effects similar to those described above are obtained. Here, in the configuration shown in FIG. 20, a personal computer 215 may be connected after the averaging circuit 240, so that an arrow mark may be generated in the personal computer 215. In this case, the arrow mark outputted from the personal computer 215 is inputted, together with the video signal, to the superposing section 211 as the image input.

Figure 22:
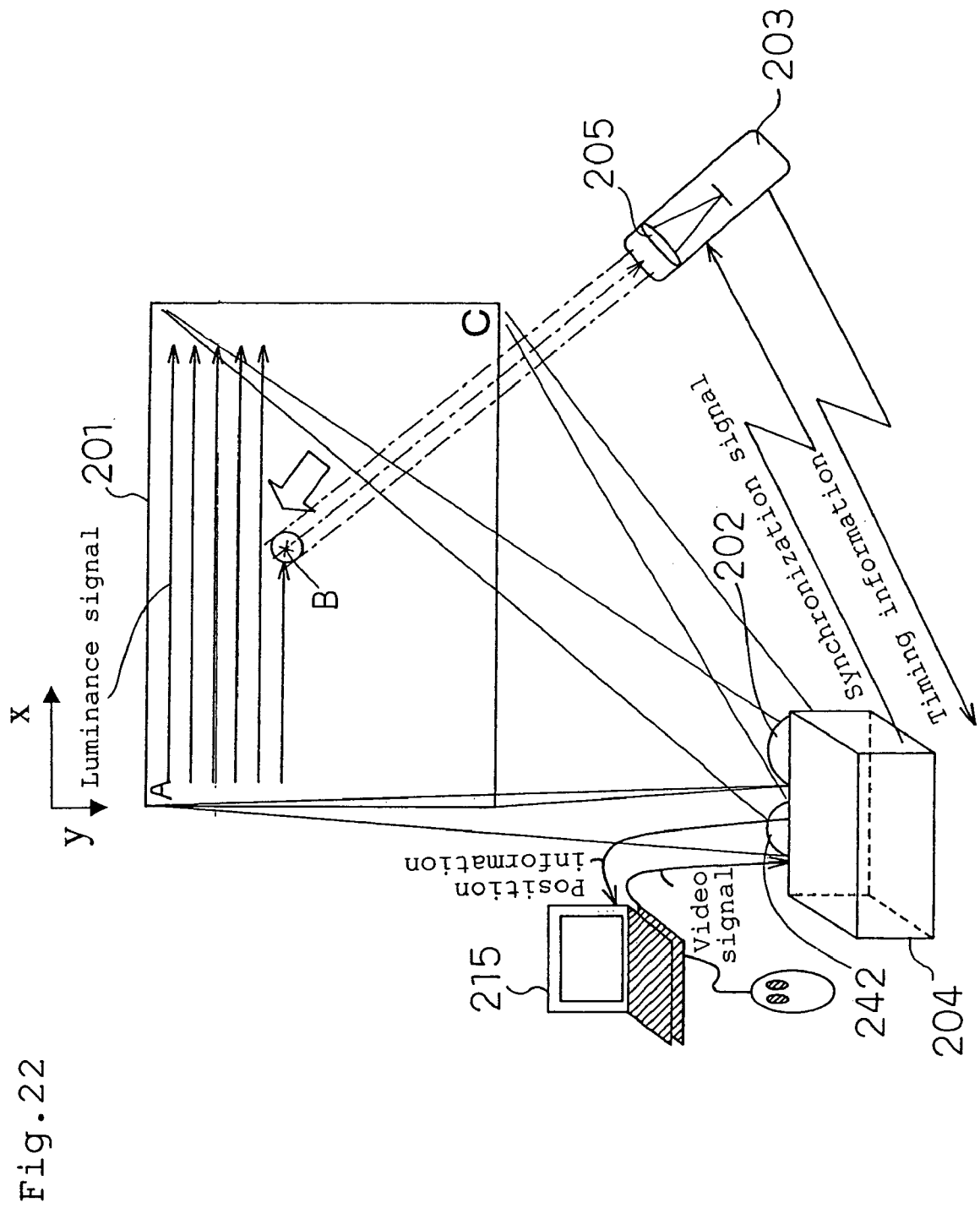
FIG. 22 is a diagram showing a schematic configuration of a modification of a projector system according to an embodiment of the present invention.
Figure 23:
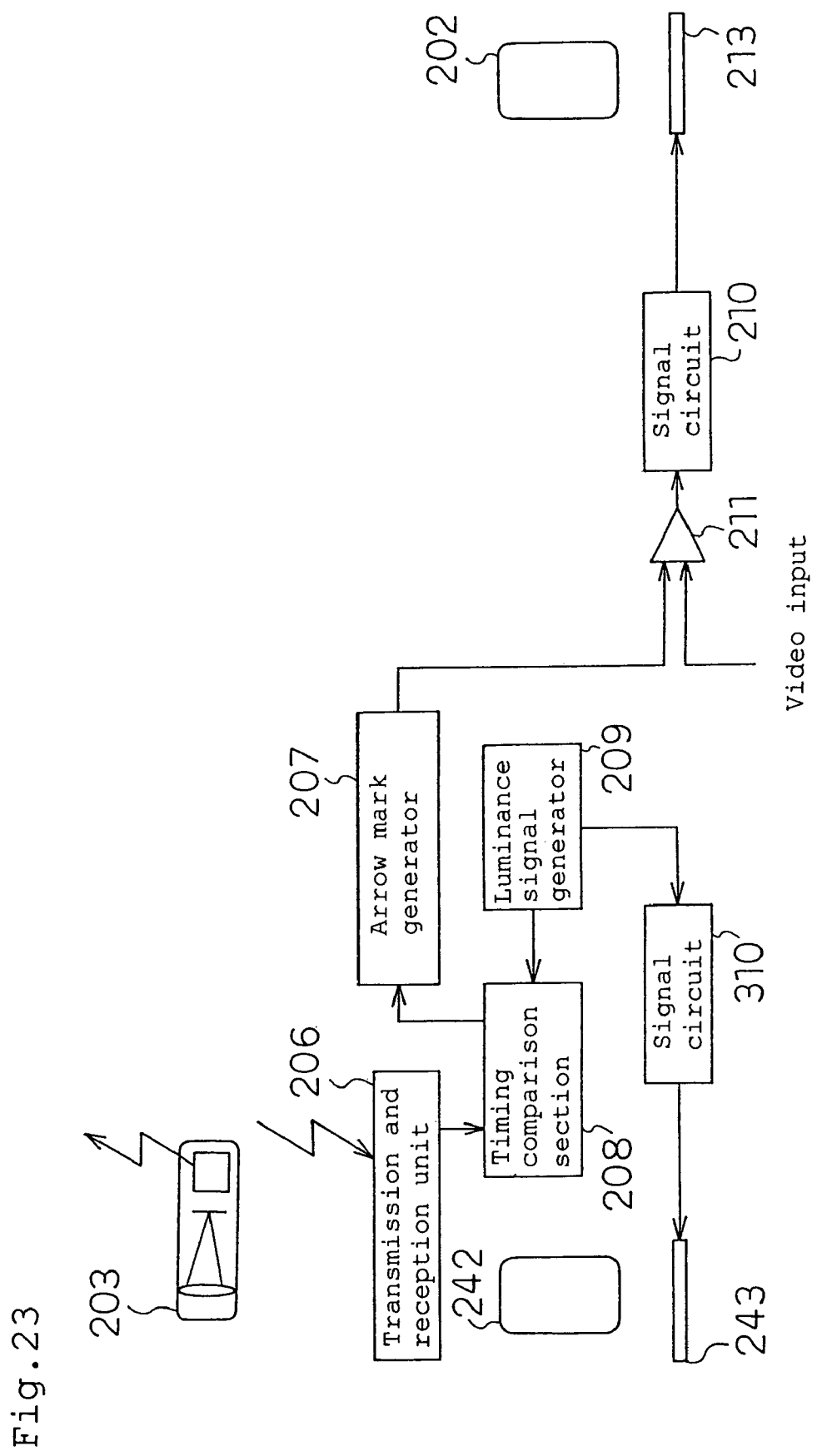
FIG. 23 is a block diagram showing an internal configuration of a projector unit in a modification of a projector system according to an embodiment of the present invention.

Further, in the description of Embodiment 6, the video signal has been superposed with the luminance signal generated as a scanning signal, and then projected onto the screen 201 via the signal circuit 210 and the projection lens 202. However, the luminance signal serving as a scanning signal may be superposed and projected onto the projected image. A schematic configuration used in this case is shown in FIG. 22. FIG. 23 shows an internal configuration of the projector unit in this case. The difference from the projector unit of FIGS. 16 and 17 is that a projection lens 242 of projecting solely a luminance signal is provided separately from the projection lens 202.

In the projector unit shown in FIG. 23, in the superposing section 211, the video signal inputted from the personal computer 215 is superposed with solely the arrow mark generated in the arrow mark generator 207, and then projected onto the screen 201 via the signal circuit 210 and the projection lens 202. On the other hand, the luminance signal generated in the luminance signal generator 209 is irradiated by the light valve 243 via the signal circuit 310 and the projection lens 242, and thereby projected and superposed onto the image projected on the screen 201. In this case, the projection lens 202, the signal circuit 210, and the light valve 213 correspond to an example of the first projection section of the present invention. Further, the projection lens 242, the light valve 243, and the signal circuit 310 correspond to an example of the second projection section of the present invention.

Also in the projector system having this configuration, effects similar to those described above are obtained. Further, in this case, the second projection section of the present invention may be contained in a unit constructed separately from the projector unit 204. In this case, the second projection section of the present invention may be arranged in the rear side of the screen 201, so that the luminance signal may be projected from the rear side such as to be transmitted through the screen 201. As such, according to the projector system shown in FIGS. 22 and 23, the luminance of the video signal can be set up independently of the luminance of the luminance signal. That is, even when the luminance signal is projected onto an area of the screen 201 where the luminance of the video signal has the maximum luminance, the area is displayed as a point having a yet higher luminance.

Further, in the description of Embodiment 6, the light-receiving element of the present invention has been a CCD. However, a light-receiving element of another type may be employed that can convert the light signal into an electric signal.

Further, in the description of Embodiment 6, the predetermined identification information of the present invention has been an arrow mark. However, a mark of another type such as a character and a symbol may be employed. That is, any type of information may be employed that permits the recognition of the part pointed by the hand-held device 203 on the screen 201.

Further, in the description of Embodiment 6, the scanning signal of the present invention has been a luminance signal. However, a signal of another type such as a wavelength signal may be employed. That is, any type of signal may be employed that permits distinction from the surrounding image with a certain means, when displayed on the screen 201.

Further, in the description of Embodiment 6, the scanning signal has been scanned over the screen 201 in approximately 1/30 second. However, the scan time of 1/30 second for the scanning signal is merely an example. Any kind of time interval that permits the detection in the hand-held device 203 may be employed as the scan time. In an extreme case, even when the scanning signal can be recognized visually, effects similar to those described above are obtained as long as the coordinates can be detected by the hand-held device 203.

In particular, in the description of FIGS. 22 and 23, infrared rays, ultraviolet rays, or the like may be used. In this case, the light-receiving element of the present invention is one capable of sensing such a signal. Further, when a fluorescent material is applied to the screen 201 in advance and then ultraviolet rays are used as a scanning signal, the luminance becomes high at a scanned location and hence can be detected by a CCD. Even in this case, effects similar to those described above are obtained.

Further, in the description of Embodiment 6, the scanning signal of the present invention has been projected in correspondence to the size of the screen 201. However, in particular, in the description of FIGS. 22 and 23, the scanning signal of the present invention may be projected onto a part of the image projected onto the screen 201 or alternatively, in a manner excessively covering the image projected on the screen 201, even outside the image. In each case, a pointed location can be specified by the hand-held device 203 within the region scanned by the scanning signal of the present invention.

Further, in the description of Embodiment 6, the synchronization signal generated in the luminance signal generator 209 has been synchronized with the timing that the luminance signal reaches point A in the image. However, the scanning signal may be synchronized with another point. In this case, the time between the point of synchronization and the point specified by the hand-held device 203 is measured so that the coordinates are calculated.

Further, in Embodiment 6, the operation until a part of the image displayed on the screen 201 is pointed by the hand-held device 203 has been described. However, when a predetermined button in the hand-held device 203 shown in FIG. 18 is operated, expansion or reduction of a specified location, page feed, or the like may also be performed. That is, an image corrected on the basis of the position of the part pointed by the hand-held device 203 may also be projected. Further, usage priority may be requested among a plurality of users.

Further, in the description of Embodiment 6, the projection target of the present invention has been implemented by the screen 201. However, the projection target of the present invention may be an object other than the screen 201. For example, projection may be performed onto a wall surface. Even in this case, when an image can be projected, and when a pointing device can point a position visually, effects similar to those described above are obtained.

Further, in Embodiment 6, the first projection section, the second projection section, and the pointed position detecting section of the present invention are not limited to the configuration described above, and may be implemented by another configuration having a similar function.

Embodiment 7

Figure 24:
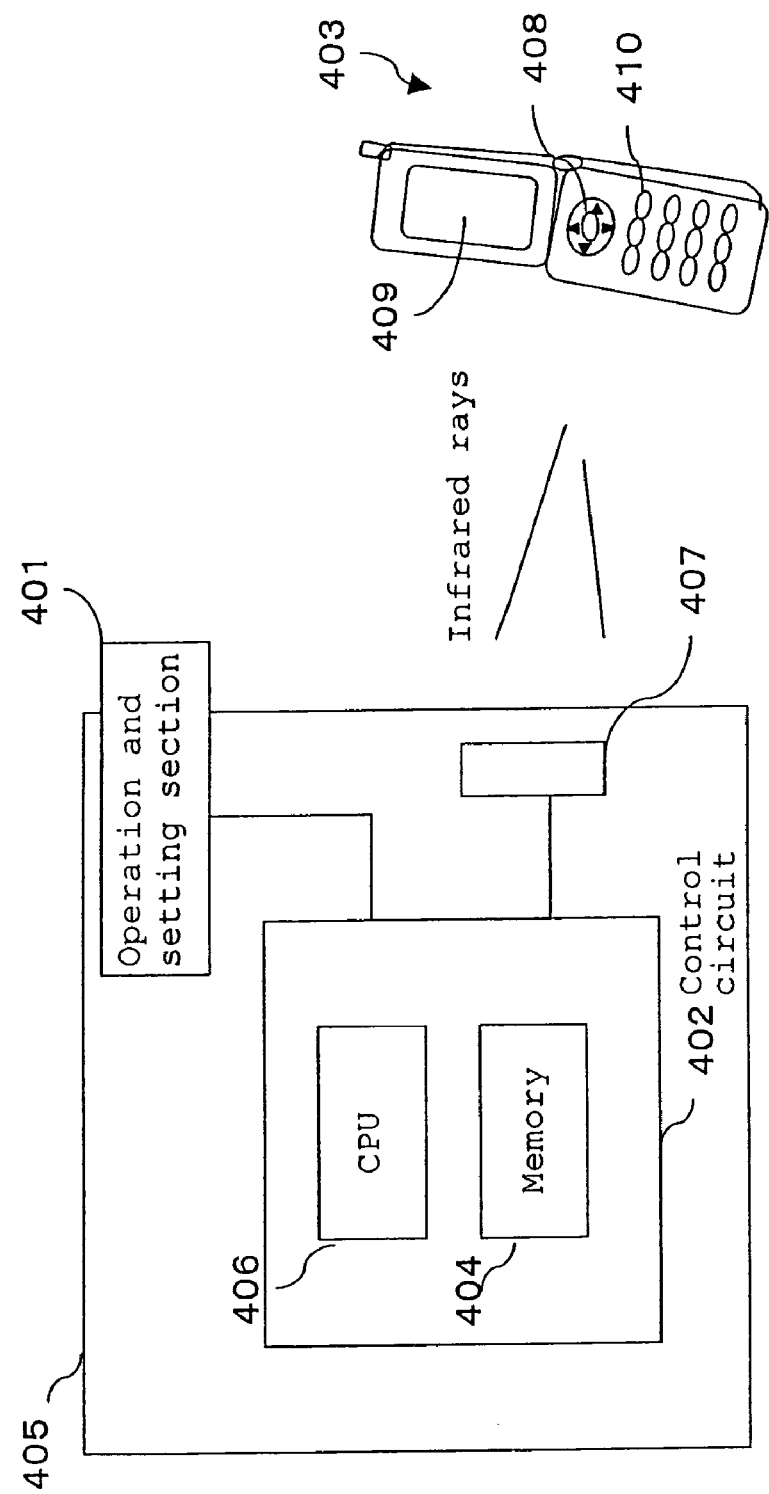
FIG. 24 is a diagram showing a schematic configuration of a projector system according to Embodiment 7 of the present invention.

FIG. 24 is a schematic diagram showing the configuration of an apparatus control system according to Embodiment 7 of the present invention. A projector unit 405 serving as an example of the control object apparatus of the present invention shown in FIG. 24 comprises an operation and setting section 401 capable of being operated or set up from the outside, a control circuit 402 of controlling the entire projector unit 405, and an infrared sensor 407 of detecting infrared rays. The control circuit 402 has a CPU 406 and a memory 404 serving as an example of the identification number recording section of the present invention. The CPU 406 corresponds also to the selecting section of the present invention.

A portable telephone 403 serving as an example of the information terminal of the present invention is of a type capable of projecting infrared rays. The portable telephone 403 is provided, in the operation surface, with a cross key 408, a numerical keypad 410, and a display screen 409 of displaying information received by the portable telephone 403. The portable telephone 403 has a specific identification number, and can transmit the identification number by infrared rays. The memory 404 of the projector unit 405 can store a plurality of identification numbers each corresponding to an individual portable telephone 403. Further, although not shown, the projector unit 405 has means or a circuit necessary for projecting an inputted video signal onto the screen 101.

Figure 25:
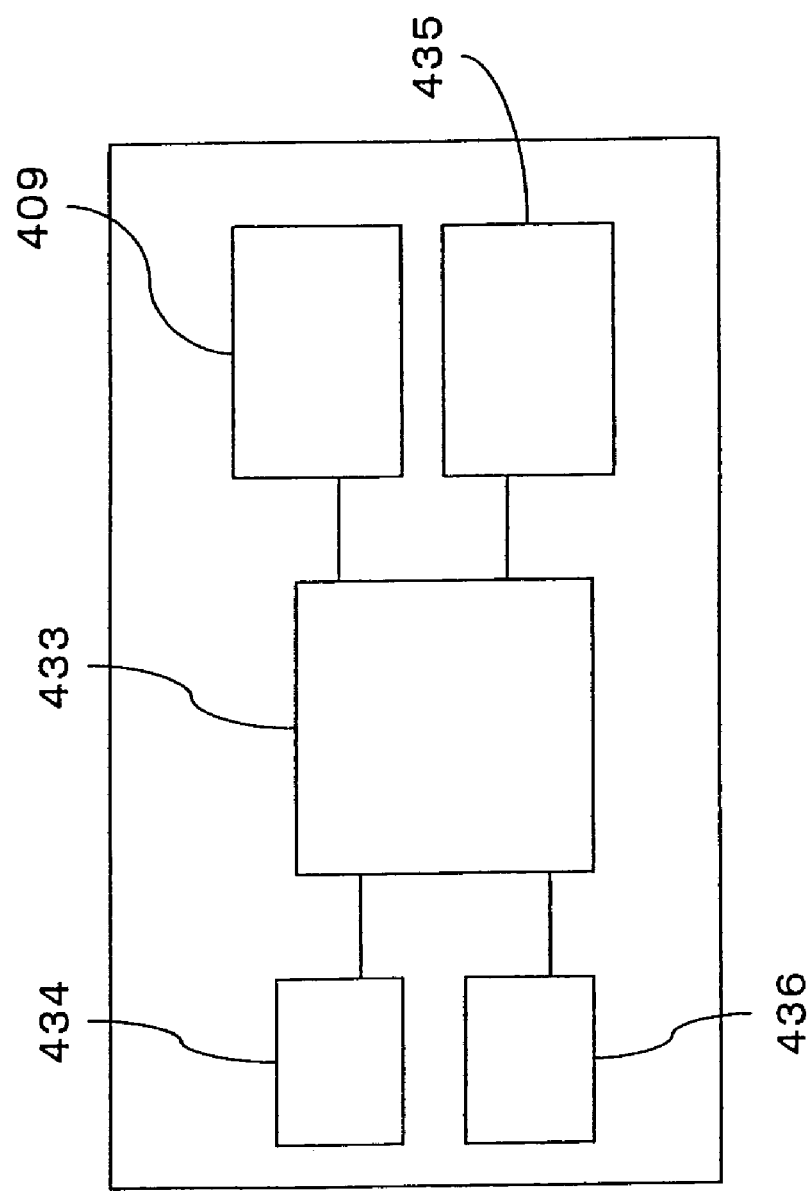
FIG. 25 is a block diagram showing an internal configuration of an information terminal in a projector system according to Embodiments 7-9 of the present invention.

FIG. 25 is a block diagram showing an internal configuration of the portable telephone 403. In the inside of the portable telephone 403, a control circuit 433 of controlling the entire portable telephone 403 is contained. The control circuit 433 is connected to an infrared irradiation section 434 of projecting infrared rays, an infrared sensor 436 of receiving infrared rays, a display screen 409, and an operation and setting section 435. The operation and setting section 435 corresponds to a numerical keypad 410, a cross key 408, and the like arranged in the surface of the portable telephone 403.

Next, the operation of the apparatus control system of the present invention having the above-mentioned configuration is described below.

When a questioner is to address a question to a presenter who is performing presentation using the projector unit, the questioner inputs a necessary command through the numerical keypad 410 or the like, and then directs the portable telephone 403 to the projector unit 405. Then, the inputted command and the identification information specific to the portable telephone 403 is transmitted from the portable telephone 403. The infrared sensor 407 of the projector unit 405 receives the information transmitted from the portable telephone 403, then converts the information into an electric signal, and transfers the signal to the control circuit 402. When receiving the transferred signal, the CPU 406 stores the signal into the memory 404, and at the same time, projects the identification number specific to the portable telephone 403 having performed the transmission, onto the screen 101 via a projection section (not shown). When the identification information of a plurality of portable telephones 403 is transmitted from each of the portable telephones 403, the CPU 406 projects each of the identification information onto the screen 1.

Figure 26:
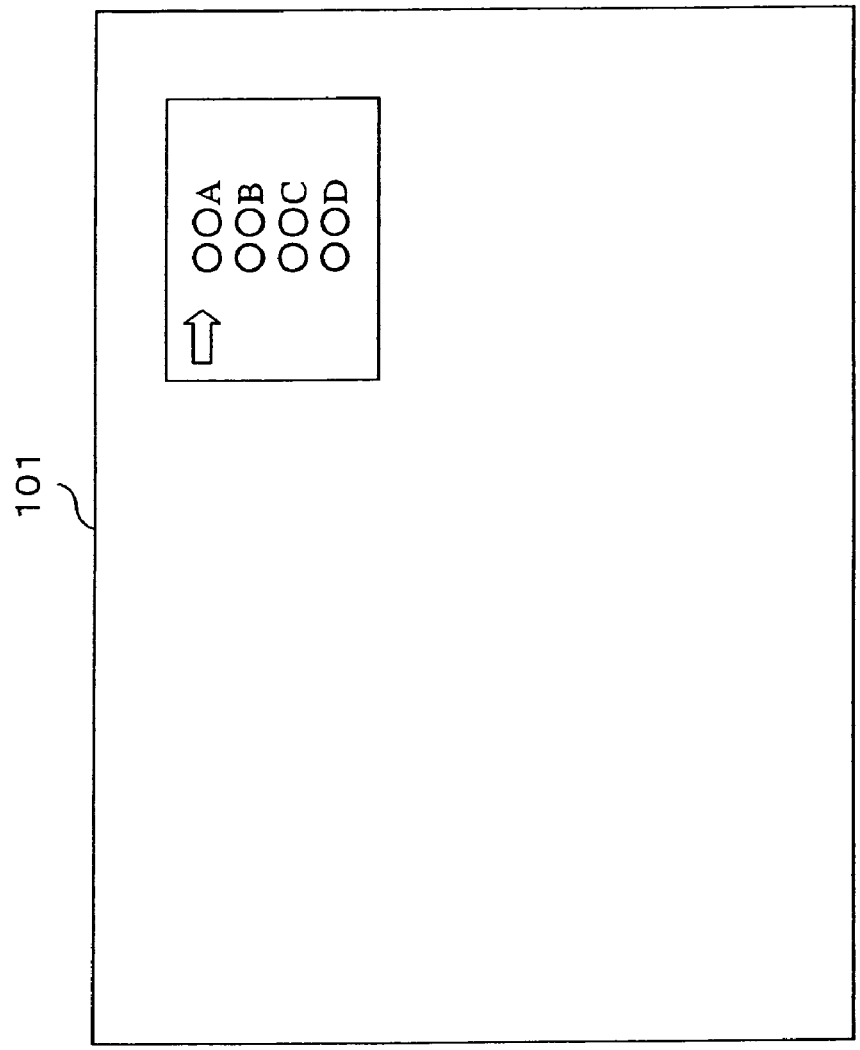
FIG. 26 is a diagram describing the situation of usage of a projector system according to Embodiment 7 of the present invention.

FIG. 26 shows a display projected onto the screen 101 in this case. In the example shown in FIG. 26, four identification numbers 00A, 00B, 00C, and 00D each transmitted from a portable telephone 403 are displayed in a manner that an image portion to be originally be projected onto the screen 101 is replaced. From among these identification numbers, the presenter selects through the operation and setting section 401 an identification number to which a question should be permitted. In this case, for example, as shown in FIG. 26, an arrow is displayed and thereby indicates that an identification number has been selected at each time of operation in the operation and setting section 401.

For example, when the identification number 00A is selected, the CPU 406 accepts solely a command transmitted from the portable telephone 403 having the identification number 00A, and ignores a command transmitted from a portable telephone 403 having another identification number. From the portable telephone 403 having the identification number 00A, for example, a pointer displayed on the screen 101 can be moved using the cross key 408. Alternatively, a page feed operation can be performed using the numerical keypad 410. Further, the portable telephone 403 may be used as a microphone.

According to the above-mentioned configuration and operation, even when accesses to the projector unit 405 coincide from a plurality of portable telephones 403, the presentation can progress without confusion.

In the description given above, when necessary operation has been performed toward the projector unit 405 from portable telephones 403, all the identification numbers have been displayed on the screen 101. However, identification numbers registered in the memory 424 in advance may solely be displayed.

Embodiment 8

Figure 27:
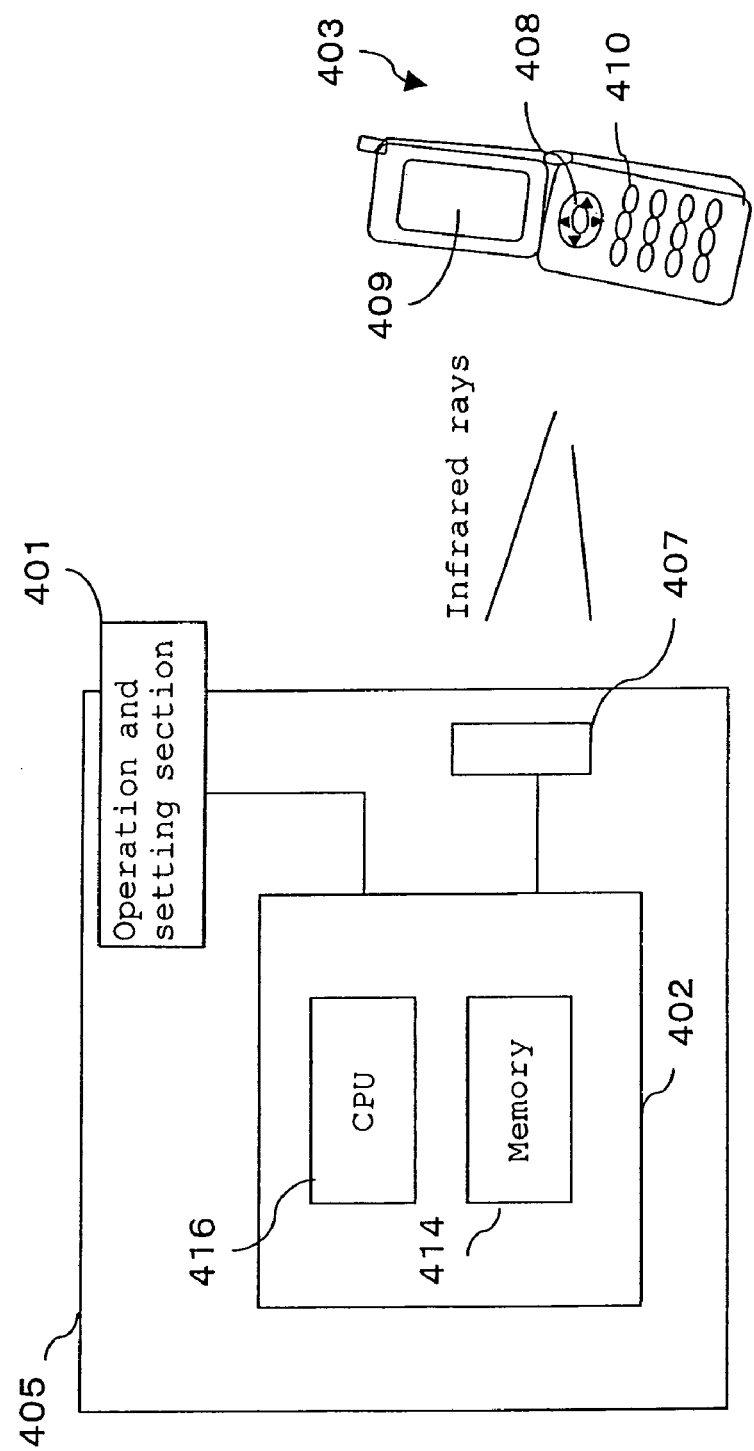
FIG. 27 is a diagram describing the situation of usage of a projector system according to Embodiment 8 of the present invention.
Figure 28:
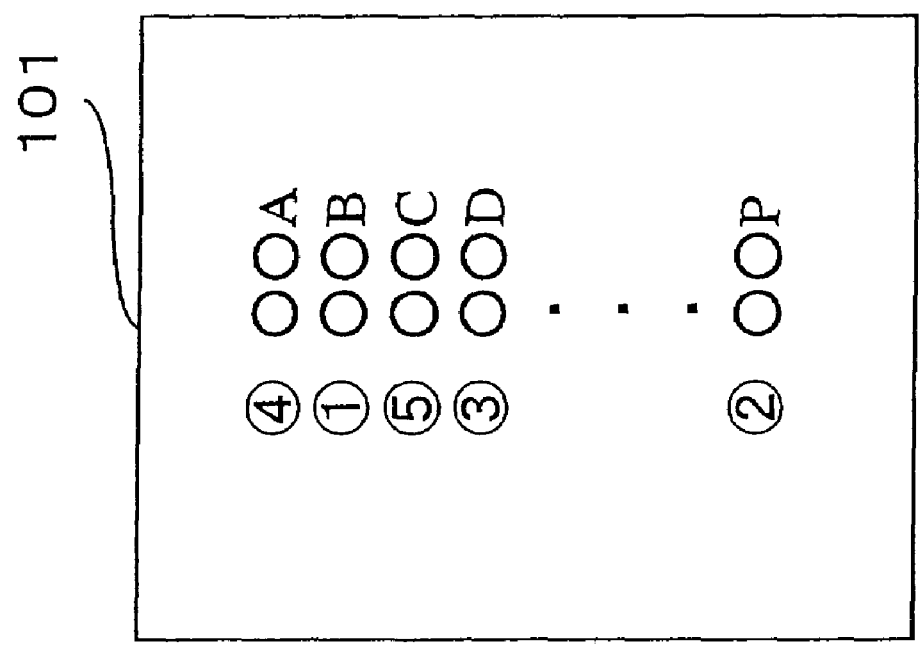
FIG. 28 is a block diagram showing an internal configuration of a hand-held device used in a projector system according to an embodiment of the present invention.

FIG. 27 is a schematic diagram showing the configuration of an apparatus control system according to Embodiment 8 of the present invention. The difference from the apparatus control system of Embodiment 7 is that a memory 414 is employed in place of the memory 404 and that a CPU 416 is employed in place of the CPU 406. The memory 414 stores a plurality of identification numbers registered in advance and the order of priority for a plurality of the identification numbers. For an example, FIG. 28 shows that an identification number range from 00A to 00P is stored. The 00B has the first priority. The 00P has the second priority. The 00D has the third priority. The 00A has the fourth priority. In a state that the order of priority is assigned as described here, for example, the portable telephone 403 having the identification number 00A and the portable telephone 403 having the identification number 00P access the projector unit 405 simultaneously. Then, the CPU 416 refers to the above-mentioned information stored in the memory 414, and thereby permits an access solely for the portable telephone 403 having the identification number 00P and having the higher priority. Thus, after this operation, operation is permitted solely for the portable telephone 403 having the identification number 00P. In a similar operation, when accesses to the projector unit 405 coincide from a plurality of portable telephones 403, an access is permitted solely for the portable telephone 403 having the identification number having the higher priority.

According to the above-mentioned configuration and operation, even when accesses coincide from a plurality of portable telephones 403, presentation can progress without confusion on the screen 101.

The order of priority described above may be determined on the basis of inputted information such as the position, the age, whether a customer or not, whether an important person or not, or the like. Alternatively, the presenter may acquire the information concerning the attendants in advance, and thereby input the order of priority into the memory 424 in advance.

In the description given above, the memory 414 has stored the order of priority determined in advance, together with the identification numbers. However, the order of priority need not be stored. Then, when accesses coincide from a plurality of portable telephones 403, the CPU 416 may select at random any one portable telephone 403 from the portable telephones 403 of performing the access. Even in this case, effects similar to those described above are obtained.

Further, only a part of the order of priority may be determined in advance. Then, the other part of the order of priority may be determined at random.

Further, in the description given above, when a plurality of accesses have coincided, one specific portable telephone 403 has been selected. However, in the case that the display on the screen 101 does not go into confusion, a plurality of specific portable telephones 403 may be selected. Even in this case, effects similar to those described above are obtained.

Further, in the description given above, each identification number has been displayed in a manner that an image portion to be originally projected onto the screen 101 is replaced. However, the identification number may be displayed in a manner superposed on the image originally projected, or alternatively may be displayed in a manner added to the image originally projected.

Further, in the description given above, each identification number has been displayed on the screen 101. However, in addition to the identification number, or alternatively in place of the identification number, the questioner's name or the like may be displayed. Alternatively, a simple title of the question may be displayed.

Embodiment 9

Figure 29:
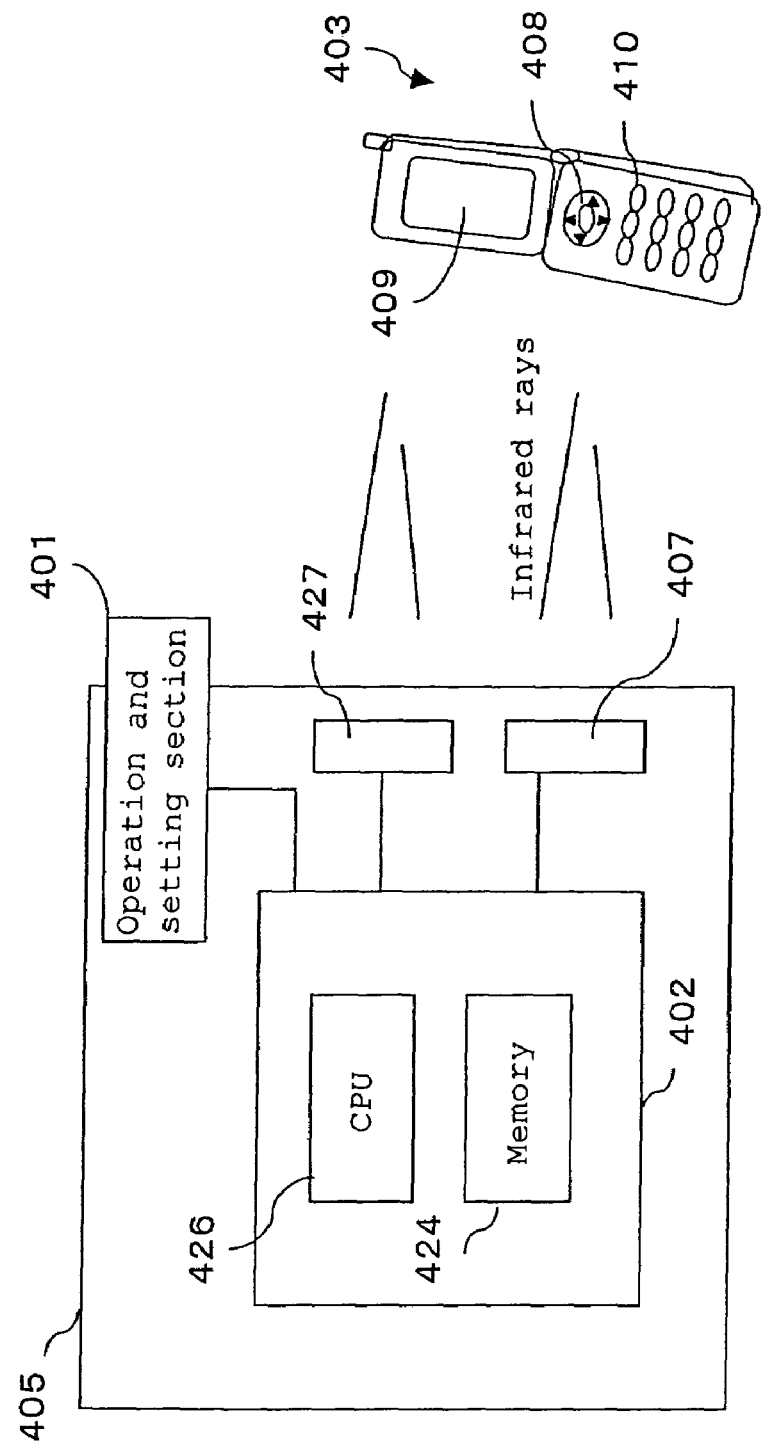
FIG. 29 is a block diagram showing an internal configuration of a projector unit in a projector system according to an embodiment of the present invention.

FIG. 29 shows a schematic configuration of an apparatus control system according to Embodiment 9 of the present invention. The difference in the structure of the apparatus control system of Embodiment 9 from that of the apparatus control system of Embodiments 7 and 8 is present in a CPU 426 and a memory 424. The configuration in the other points is similar to that of the apparatus control system of Embodiments 7 and 8, and hence their description is omitted. In the apparatus control system of Embodiment 9, usage priority can be transferred among portable telephones 403.

In the apparatus control system of the present embodiment, the functions of approving usage priority and canceling usage priority (referred to as a usage priority approval button and a usage priority cancellation button, hereafter) are assigned to the numerical keypad 410 of the portable telephone 403 operated by a presenter and serving as a main unit. Further, the function of requesting usage priority (referred to as a usage priority request button, hereafter) is assigned to the numerical keypad 410 of the portable telephone 403 operated by an audience person and serving as a sub unit.

FIG. 14 is a diagram showing the flow of transfer of usage priority from a main unit to a sub unit, in the case that the portable telephone 403 operated by a presenter serves as the main unit, and that the portable telephone 403 operated by an audience person serves as the sub unit.

First, when the usage priority request button of the sub unit is pushed, the control circuit 433 of the sub unit generates a usage priority request (step 101). Then, the control circuit 433 of the sub unit determines whether the sub unit has usage priority (step 102). When the sub unit has usage priority, the operation is terminated (step 114). When the control circuit 433 of the sub unit determines that the sub unit does not have usage priority, a usage priority request signal is generated (step 103). The generated usage priority request signal is transmitted via the infrared irradiation section 434 (step 104).

The transmitted usage priority request signal is received by the infrared sensor 407 of the projector unit 405, and then transmitted via the CPU 426 from the infrared irradiation section 427 to the main unit. When the usage priority request signal is received by the infrared sensor 436 of the main unit (step 105), the received usage priority request signal is transmitted to the control circuit 433 of the main unit (step 106). Then, the display screen 409 of the main unit displays the ID of the sub unit having transmitted the usage priority request signal and the message that a usage priority request has been transmitted. The control circuit 433 of the main unit determines whether the usage priority request signal transmitted from the sub unit is to be approved (step 107).

That is, with checking the contents displayed on the display screen 409, when the presenter approves the usage priority request from the sub unit, the presenter pushes the usage priority approval button of the main unit. Then, the control circuit 433 of the main unit cancels the main unit's own usage priority (step 108), and then stores the usage priority of the sub unit into the memory 424 (step 109). Then, a usage priority approval signal for the sub unit is generated in the control circuit 433, and then transmitted to the sub unit via the infrared irradiation section 427 of the main unit (step 110). The infrared sensor 436 of the sub unit receive the usage priority approval signal transmitted from the main unit (step 111). The control circuit 433 of the sub unit stores the presence of usage priority (step 112), and then performs processing (step 114). The display screen 409 of the main unit displays that a specific sub unit has usage priority. Further, in the sub unit, a display screen 409 or the like displays that the sub unit itself has usage priority.

When the presenter does not approve the usage priority request from the sub unit, the presenter does not push the usage priority approval button. In this case, the usage priority approval request from the sub unit is ignored. Then, the processing in the main unit is terminated (step 113).

FIG. 15 is a diagram showing the flow that the main unit cancels the usage priority of a sub unit.

With watching the display screen 409, when the presenter desires to cancel the usage priority of a sub unit, the presenter pushes the usage priority cancellation button of the main unit (step 120). When the usage priority cancellation button is pushed, the control circuit 433 of the main unit checks whether a sub unit has usage priority (step 121). When no sub unit has usage priority, the processing is terminated (step 128). When it is confirmed that usage priority is present in a specific sub unit or any one of the sub units, the control circuit 433 of the main unit generates a priority cancellation request signal (step 122). The generated usage priority cancellation request signal is transmitted to the sub unit similarly to the case of FIG. 14 (step 123). When the usage priority cancellation signal is received by the sub unit (step 124), the usage priority cancellation signal is transmitted to the control circuit 433 (step 125). The control circuit 433 of the sub unit cancels the usage priority set up in the sub unit (step 126), and then stores the state that usage priority is canceled (step 129). Then, the processing is terminated (step 130).

In the description of FIG. 15, the display screen 409 may display the IDs of a plurality of sub units where cancellation is to be performed. Then, the presenter may cancel a specific sub unit selected from the plurality, or alternatively may cancel the usage priority of a plurality of the sub units simultaneously.

In the description given above with reference to FIGS. 14 and 8, the display screen 409 of the main unit may be a lamp or the like. In this case, it may be indicated which sub unit has usage priority. Alternatively, regardless of a specific sub unit, the situation may be displayed that usage priority is present in any one of the sub units.

As for the usage priority approval button and the usage priority cancellation button, for example, the main unit may also have functions similar to those of the sub unit. Then, the configuration may be such that in the case that usage priority is present in the main unit, usage priority of the sub unit is approved when the usage priority request button of the main unit is operated or not operated. Further, in the case that usage priority is present in the sub unit, the usage priority of the sub unit may be canceled in response to the pushing of the usage priority request button of the main unit according to an operation similar to that described above.

Further, in the description of Embodiments 7-9, the infrared sensor 407 or the infrared irradiation section 427 need not be arranged inside the projector unit 405, and may be arranged outside the projector unit, for example, in the ceiling of the hall.

Further, in the description of Embodiments 7-9, the communication between the projector unit 405 and the portable telephone 403 has been achieved by infrared rays. However, the communication may be performed by wireless. In the case of Embodiments 7 and 8, a transmission and reception circuit may be arranged also in the projector unit 405. Then, connection may be established via the base station. In the case of Embodiment 9, the portable telephones 403 may directly be connected to each other via a base station.

Further, in the description of Embodiments 7-9, the portable telephone 403 used by the presenter has served as a main unit, while the portable telephone 403 used by an audience person has served as a sub unit. However, a specific person among the audience persons may operate the main unit. Alternatively, the chairperson may possess the main unit.

Further, in the description of Embodiments 7 and 8, the infrared sensor 436 may be omitted.

Figure 30:
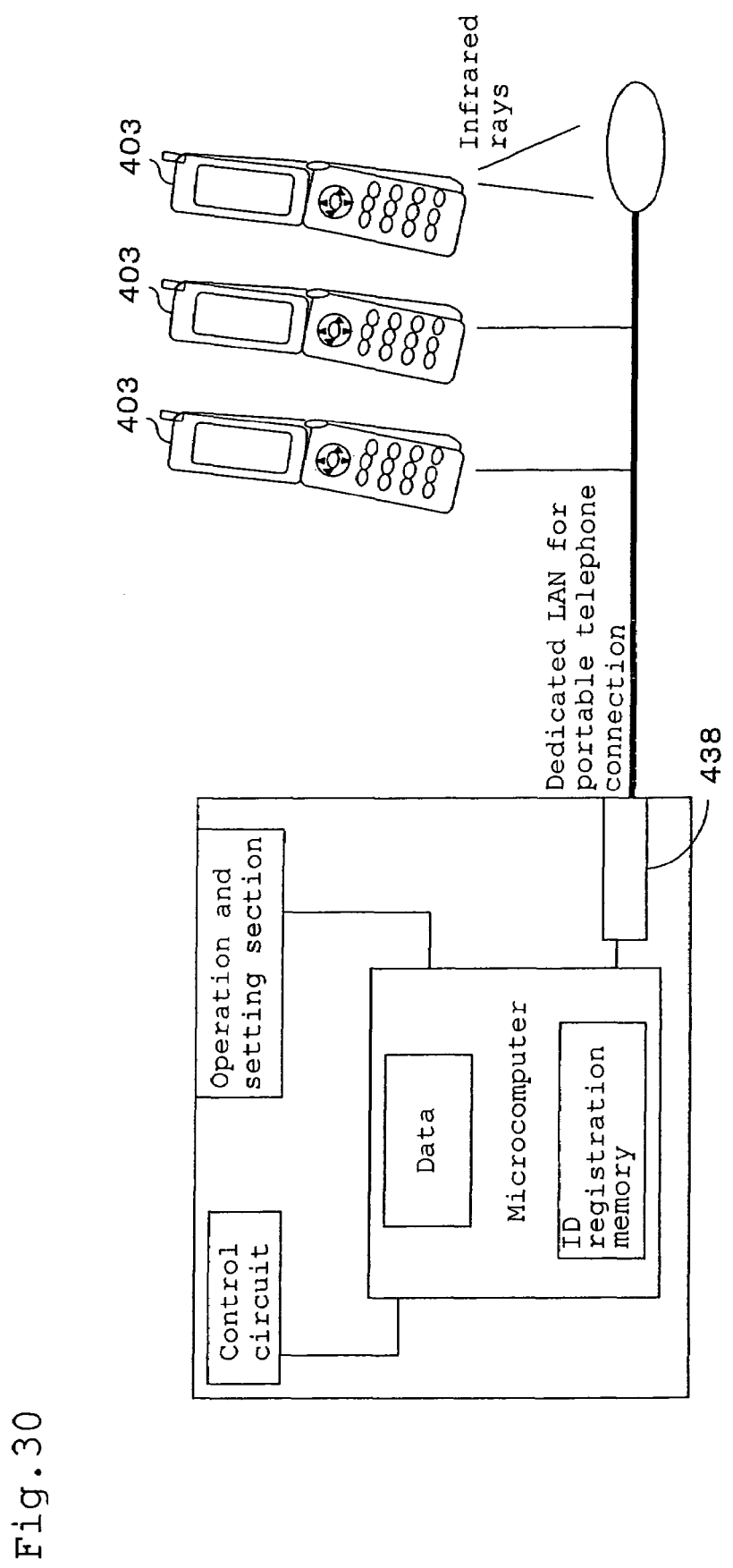
FIG. 30 is a block diagram showing an internal configuration of a projector unit in a modification of a projector system according to an embodiment of the present invention.
Figure 31:
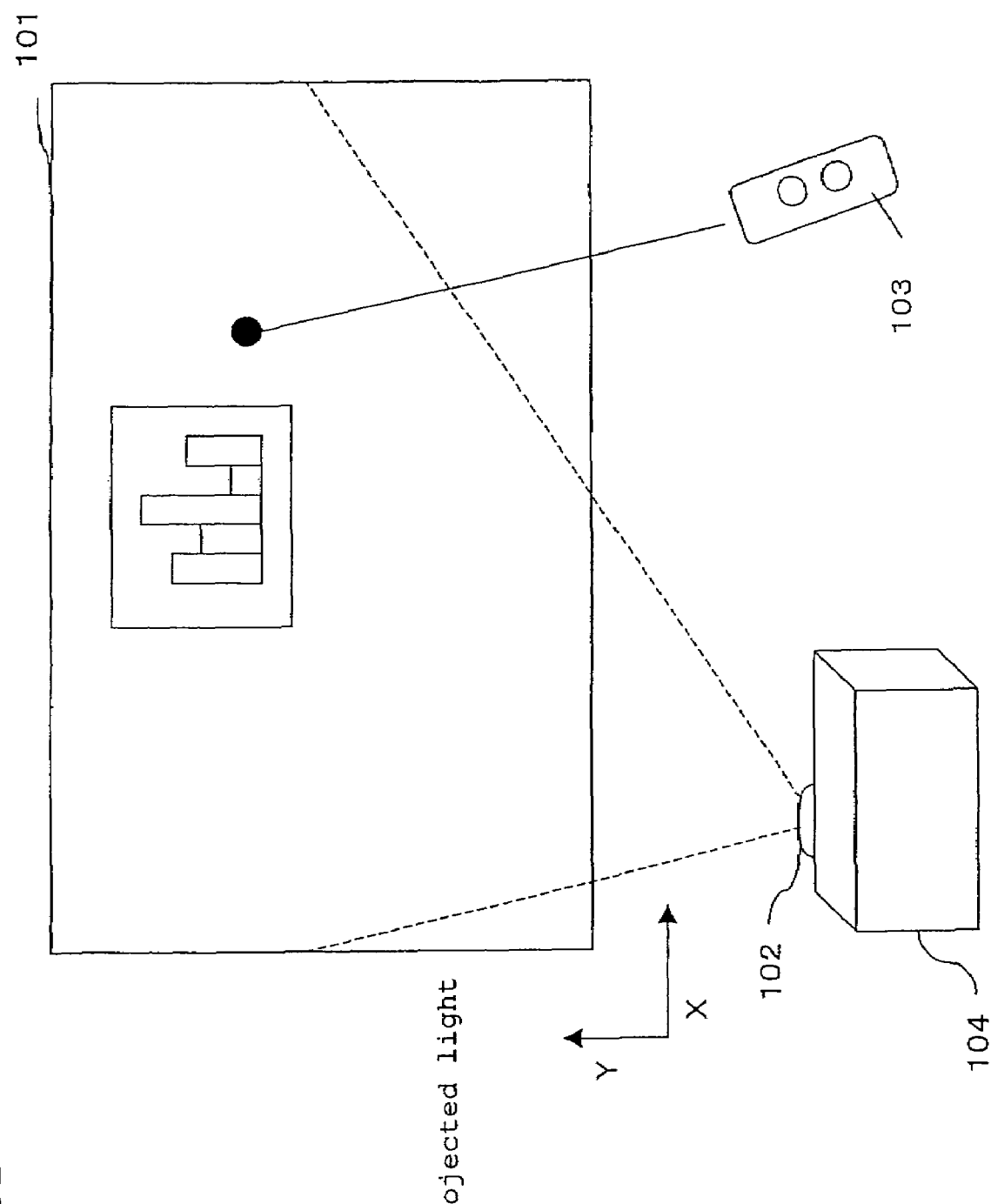
FIG. 31 is a diagram showing a schematic configuration of a prior art projector system.

Further, in the description of Embodiments 7-9, the communication between the portable telephone 403 and the projector unit 405 has been achieved by infrared rays or wireless. However, as shown in FIG. 30, the connection may be established via a dedicated line. For example, when the portable telephone 403 is connected through a LAN line dedicated for portable telephone connection, the concern of leakage of the information is avoided. That is, the data such as video information accumulated in the projector unit 405 is prevented from being exposed to many and unspecified accesses. This improves the security of the information. In this case, the connection between the portable telephone 403 and the dedicated LAN line may be established using a LAN card. Alternatively, a part of the connection may be established by infrared rays. The projector unit 405 may have a dedicated communication interface 438.

The identification number in Embodiments 7-9 may be a telephone number, a mail address, or the like.

Further, in the description of Embodiments 7-9, the object apparatus controlled by the portable telephone 403 has been the projector unit 405. However, any type of apparatus may be employed that can be remotely operated. For example, the portable telephone 403 may be used as a television remote controller. Then, such an operation is possible that unless the usage priority of a portable telephone 403 serving as a main unit is canceled, a portable telephone 103 serving as a subunit cannot operate. Further, an air conditioner may be controlled similarly. Even in this case, confusion in the information is avoided in controlling the object apparatus. Thus, effects similar to those described above are obtained.

Further, in the description of Embodiments 7-9, the information terminal of the present invention has been the portable telephone 403, however, another type of information terminal, which is not limited to the portable telephone 403, may be used. Examples of such an information terminal include a notebook personal computer, a PDA, a remote control terminal, and the like, and are not limited to these.

The program of the present invention is a program which causes a computer to perform the function of all or a part of the means of the projector system, the projector unit, the apparatus control system, or the information terminal of the present invention described above, and which operates in cooperation with the computer.

The recording medium of the present invention is a computer-readable recording medium which carries a program of causing a computer to perform all or a part of the function of all or a part of the means (or apparatus or the like) of the projector system, the projector unit, the apparatus control system, or the information terminal of the present invention described above, wherein said program having been read out performs said function in cooperation with said computer.

Said phrase "a part of the means (or apparatuses or the like)" of the present invention indicates a piece or pieces of means among plural pieces of the means.

Said phrase "the function of means (or an apparatus or the like)" of the present invention indicates all or a part of the function of said means, while said phrase "the operation of a step (or a process step, an operation, an action, or the like)" of the present invention indicates all or a part of the operation of said step.

A mode of use of the program according to the present invention may be that the program is recorded in a computer-readable recording medium and operates in cooperation with a computer.

A mode of use of the program according to the present invention may be that the program is transmitted through a transmitting medium, read out by a computer, and operates in cooperation with the computer.

The scope of the recording medium includes a ROM, while the scope of the transmitting medium includes a transmitting medium such as the Internet, light, radiowaves, and acoustic waves.

The above-mentioned computer according to the present invention is not limited to genuine hardware such as a CPU, and may be firmware, an OS, and a peripheral device.

As described above, the configuration according to the present invention may be implemented by software or hardware.

According to the projector system and the image projection method of the present invention, not solely a presenter but also an audience person can operate image display. Thus, the invention is useful as a projector system, a projector unit, an information terminal, a pointing section, an apparatus control system, an apparatus control method, and the like.

The invention claimed is:

1. A projector system comprising:
a projection section for projecting an image onto a projection target using an inputted image information;
a plurality of pointing devices for pointing to a part of the image projected onto the projection target;
a control section for approving usage priority to be set up in a specific pointing device of the pointing devices;
a pointed position detecting section for detecting a position of the part pointed to by the specific pointing device in which the approved usage priority is set up; and
an image information correction section for correcting the inputted image information on the basis of the detected position of the part,
wherein the projection section projects a corrected image onto the projection target using the corrected image information.

2. A projector system according to claim 1, further comprising a recognition section for recognizing an image including the part of the image projected onto the projection target,
wherein the pointed position detecting section detects the position of the part pointed to by the specific pointing device using the recognized image.

3. A projector unit comprising:
a projection section for projecting an image onto a projection target using an inputted image information;
a control section for approving usage priority to be set up in a specific pointing device of a plurality of pointing devices for pointing to a part of the image projected onto the projection target;
a pointed position detecting section for detecting a position of the part pointed to by the specific pointing device in which the approved usage priority is set up; and
an image information correction section for correcting the inputted image information on the basis of the detected position of the part,
wherein the projection section projects a corrected image onto the projection target using the corrected image information.

4. An image projection method comprising:
an image projection step for projecting an image onto a projection target using an inputted image information;
a control step for approving usage priority to be set up in a specific pointing device of a plurality of pointing devices for pointing to a part of the image projected onto the projection target;
a pointed position detecting step for detecting a position of the part pointed to by the specific pointing device in which the approved usage priority is set up;
an image information correction step for correcting the inputted image information on the basis of the detected position of the part; and
a corrected image projection step for projecting a corrected image onto the projection target using the corrected image information.

5. A program on a computer-readable medium, which program causes a computer to act as the control step for approving usage priority to be set up in a specific pointing device of a plurality of pointing devices for pointing to a part of the image projected onto the projection target, and to act as the image information correction step for correcting the inputted image information on the basis of the detected position of the part, in the image projection method according to claim 4.

6. A computer-readable recording medium of recording the program according to claim 5.

* * * * *